US012609870B2

(12) United States Patent
Kumar et al.

(10) Patent No.: US 12,609,870 B2
(45) Date of Patent: Apr. 21, 2026

(54) CONDITIONAL ARTIFICIAL INTELLIGENCE, MACHINE LEARNING MODEL, AND PARAMETER SET CONFIGURATIONS

(71) Applicant: QUALCOMM Incorporated, San Diego, CA (US)

(72) Inventors: Rajeev Kumar, San Diego, CA (US); Xipeng Zhu, San Diego, CA (US); Shankar Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 17/841,339

(22) Filed: Jun. 15, 2022

(65) Prior Publication Data

US 2023/0412470 A1     Dec. 21, 2023

(51) Int. Cl.
*H04L 41/16* (2022.01)
*G06N 20/20* (2019.01)
*H04W 88/02* (2009.01)

(52) U.S. Cl.
CPC ............. *H04L 41/16* (2013.01); *G06N 20/20* (2019.01); *H04W 88/02* (2013.01)

(58) Field of Classification Search
CPC ........ H04L 41/16; G06N 20/20; H04W 88/02
USPC ....................................................... 709/224
See application file for complete search history.

(56) References Cited

U.S. PATENT DOCUMENTS

| | | | |
|---|---|---|---|
| 11,061,798 B1 * | 7/2021 | Jain ...................... | G06F 11/3466 |
| 11,527,786 B1 * | 12/2022 | Budan ........................ | B60L 3/12 |
| 2019/0294999 A1 * | 9/2019 | Guttmann ............. | G06F 18/231 |
| 2020/0202243 A1 * | 6/2020 | Guttmann ............. | G06N 20/00 |
| 2021/0328630 A1 * | 10/2021 | Ryu ...................... | H04B 7/0632 |
| 2021/0344745 A1 * | 11/2021 | Mermoud ............ | G06N 3/0895 |
| 2022/0253647 A1 * | 8/2022 | Perkins ............... | G06F 11/3086 |
| 2023/0006913 A1 * | 1/2023 | Lo ........................ | H04L 41/0853 |

OTHER PUBLICATIONS

International Search Report and Written Opinion—PCT/US2023/067994—ISA/EPO—Aug. 30, 2023.

* cited by examiner

*Primary Examiner* — Dhairya A Patel
(74) *Attorney, Agent, or Firm* — Holland & Hart LLP

(57) ABSTRACT

Methods, systems, and devices for wireless communications are described. A user equipment (UE) may receive a message from a network entity indicating a set of machine learning models, a set of parameter sets, or both and one or more usage conditions associated with the machine learning models and parameter sets. Based on a usage condition being satisfied, the UE may select a machine learning model, a parameter set, or both for generating a machine learning inference. For example, the UE may select the machine learning model or the parameter set based on a priority, whether sufficient input data is provided, or based on other usage conditions. The UE may generate the machine learning inference using the selected machine learning model or the selected parameter set, and the UE may transmit a report indicating an output of the machine learning inference to the network entity.

28 Claims, 19 Drawing Sheets

Model registration 215

Feedback 235

Parameter set

130

105

115

Network
Entity

Transceiver

1310

Antenna

1315

Communications
Manager

1320

Memory

Code

1330

1325

1340

Processor

1335

1305

1300

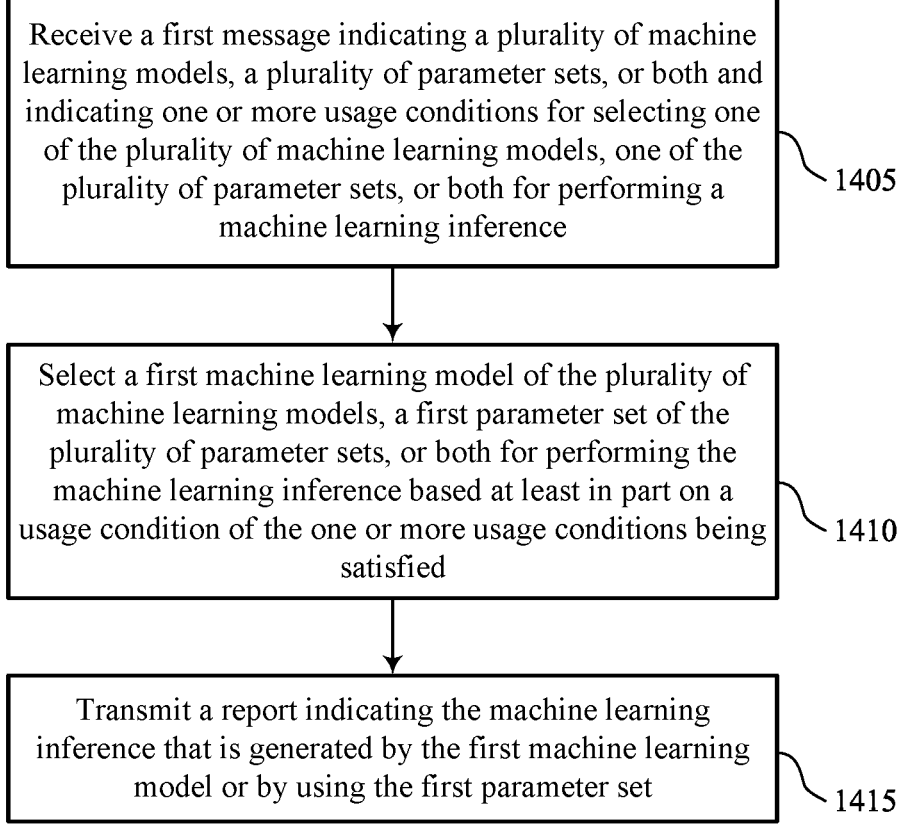

Receive a first message indicating a plurality of machine learning models, a plurality of parameter sets, or both and indicating one or more usage conditions for selecting one of the plurality of machine learning models, one of the plurality of parameter sets, or both for performing a machine learning inference

1405

Select a first machine learning model of the plurality of machine learning models, a first parameter set of the plurality of parameter sets, or both for performing the machine learning inference based at least in part on a usage condition of the one or more usage conditions being satisfied

1410

Transmit a report indicating the machine learning inference that is generated by the first machine learning model or by using the first parameter set

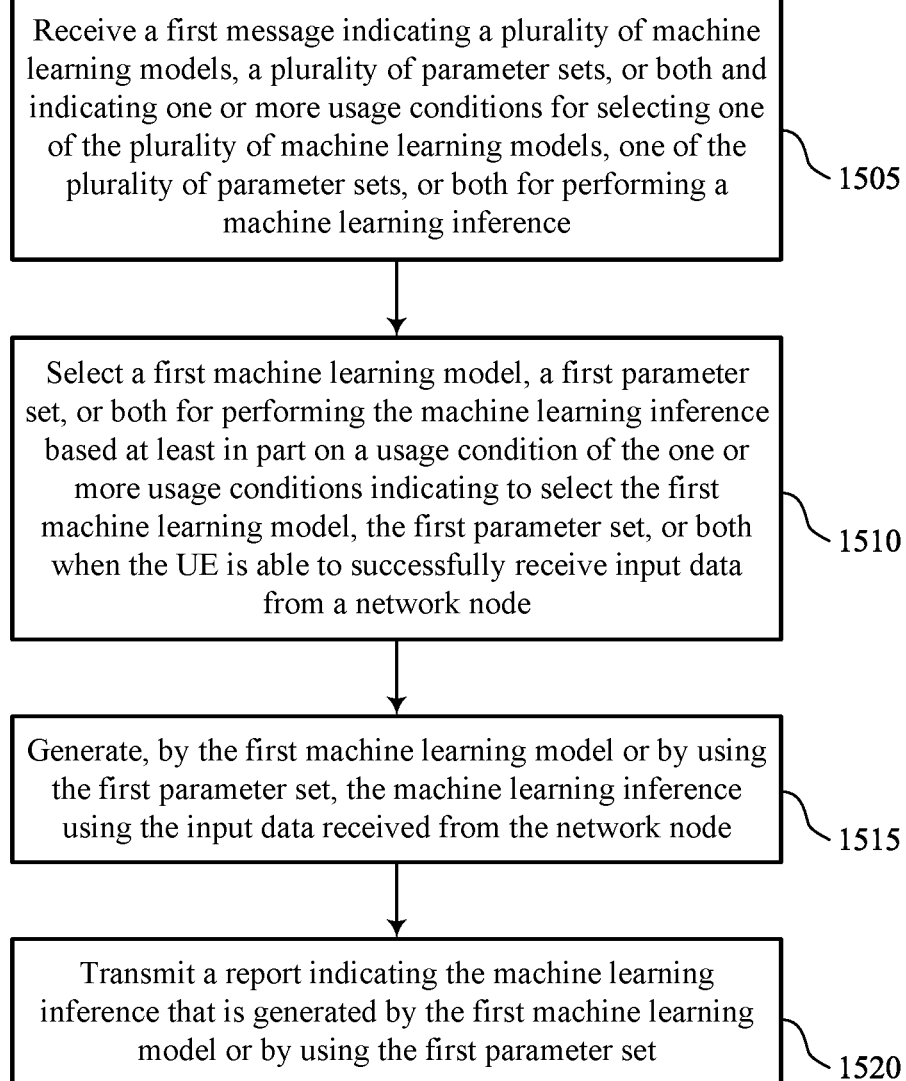

Receive a first message indicating a plurality of machine learning models, a plurality of parameter sets, or both and indicating one or more usage conditions for selecting one of the plurality of machine learning models, one of the plurality of parameter sets, or both for performing a machine learning inference

1505

Select a first machine learning model, a first parameter set, or both for performing the machine learning inference based at least in part on a usage condition of the one or more usage conditions indicating to select the first machine learning model, the first parameter set, or both when the UE is able to successfully receive input data from a network node

1510

Generate, by the first machine learning model or by using the first parameter set, the machine learning inference using the input data received from the network node

1515

Transmit a report indicating the machine learning inference that is generated by the first machine learning model or by using the first parameter set

Figure 16:
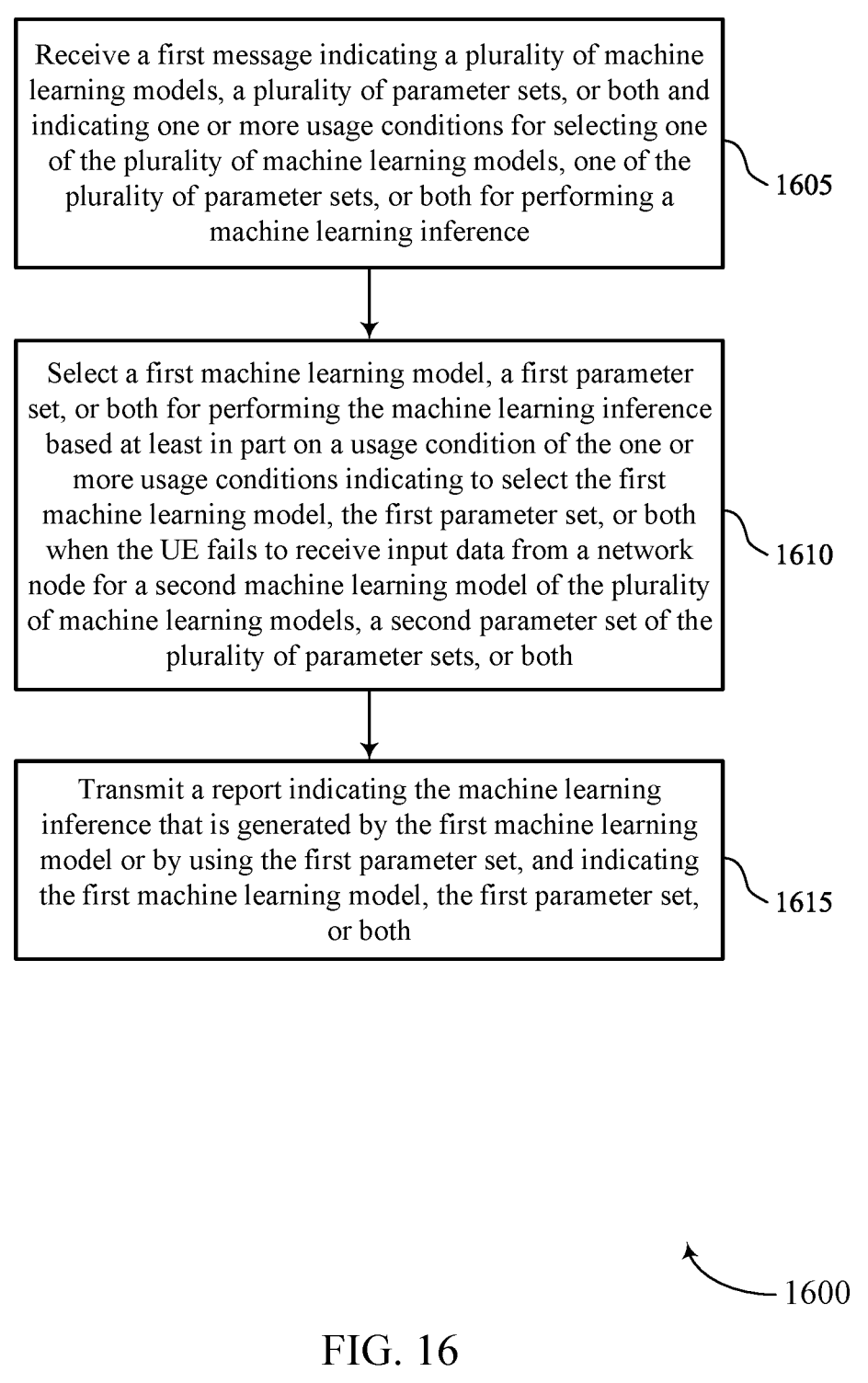

Receive a first message indicating a plurality of machine learning models, a plurality of parameter sets, or both and indicating one or more usage conditions for selecting one of the plurality of machine learning models, one of the plurality of parameter sets, or both for performing a machine learning inference

1605

Select a first machine learning model, a first parameter set, or both for performing the machine learning inference based at least in part on a usage condition of the one or more usage conditions indicating to select the first machine learning model, the first parameter set, or both when the UE fails to receive input data from a network node for a second machine learning model of the plurality of machine learning models, a second parameter set of the plurality of parameter sets, or both

1610

Transmit a report indicating the machine learning inference that is generated by the first machine learning model or by using the first parameter set, and indicating the first machine learning model, the first parameter set, or both

Figure 17:
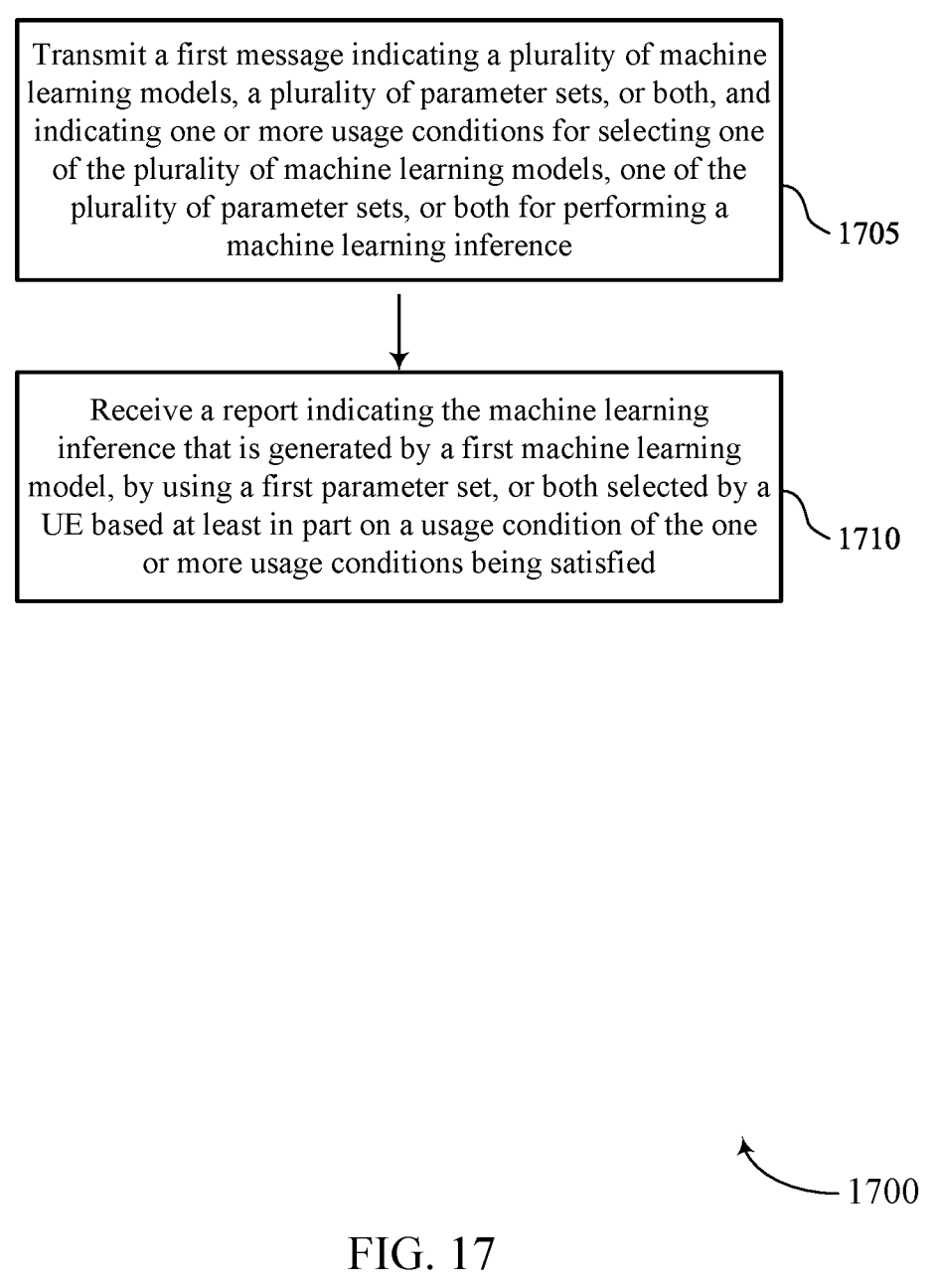

Transmit a first message indicating a plurality of machine learning models, a plurality of parameter sets, or both, and indicating one or more usage conditions for selecting one of the plurality of machine learning models, one of the plurality of parameter sets, or both for performing a machine learning inference

1705

Receive a report indicating the machine learning inference that is generated by a first machine learning model, by using a first parameter set, or both selected by a UE based at least in part on a usage condition of the one or more usage conditions being satisfied

Transmit a first message indicating a plurality of machine learning models, a plurality of parameter sets, or both, and indicating one or more usage conditions for selecting one of the plurality of machine learning models, one of the plurality of parameter sets, or both for performing a machine learning inference

1805

Receive a report indicating the machine learning inference that is generated by a first machine learning model or by using a first parameter set selected by a UE based at least in part on a usage condition of the one or more usage conditions being satisfied

1810

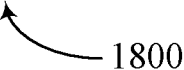

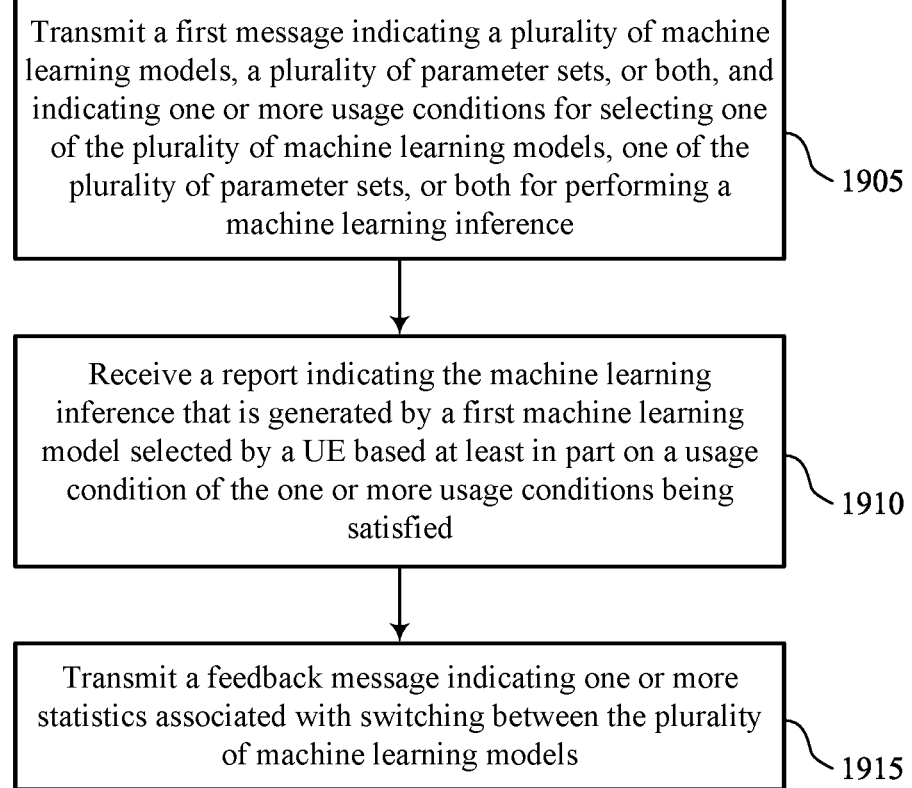

Transmit a first message indicating a plurality of machine learning models, a plurality of parameter sets, or both, and indicating one or more usage conditions for selecting one of the plurality of machine learning models, one of the plurality of parameter sets, or both for performing a machine learning inference

1905

Receive a report indicating the machine learning inference that is generated by a first machine learning model selected by a UE based at least in part on a usage condition of the one or more usage conditions being satisfied

1910

Transmit a feedback message indicating one or more statistics associated with switching between the plurality of machine learning models

CONDITIONAL ARTIFICIAL INTELLIGENCE, MACHINE LEARNING MODEL, AND PARAMETER SET CONFIGURATIONS

FIELD OF TECHNOLOGY

The following relates to wireless communications, including conditional artificial intelligence (AI), machine learning model, and parameter set configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a user equipment (UE) may use a machine learning model to make predictions based on learned data. In some cases, however, input data for the machine learning model may be missing or corrupt, which may result in errors in the predictions.

SUMMARY

The described techniques relate to improved methods, systems, devices, and apparatuses that support conditional artificial intelligence (AI), machine learning model, and parameter set configurations. For example, the described techniques provide for conditional machine learning model and parameter set configurations, where for AI and machine learning inference and training, a network entity may configure model identifiers (IDs) and/or parameter sets together with usage conditions for multiple machine learning models, multiple parameter sets, or both. In some examples, missing input data (e.g., from the network entity) may be one of the usage conditions. In addition, the network entity may configure other usage conditions. Examples of machine learning model and parameter set usage conditions for inference and training may include an availability of model input parameters, an area scope, a validity timer of the model, a validity timer of the parameter set, configurations of the network entity and a user equipment (UE), key performance indicators (KPIs) of a model, a physical environment (e.g., indoors, outdoors, and other physical settings), or any combination thereof. Using machine learning model configurations, parameter set configurations, and usage conditions in this way may manage missing or corrupt input data for a machine learning model and thus, reduce errors in an output of the machine learning model.

In some examples, one or more machine learning models and corresponding parameter sets may be trained such that a given machine learning model, a given parameter set, or both may be unaffected by missing or corrupted input data. The one or more machine learning models, the one or more parameter sets, or both may use input data from the UE and the network entity, or input data just from the UE, to generate a machine learning inference. Machine learning inference may be a process of running live data points through a trained machine learning model and parameter set to calculate an output. Information about the one or more machine learning models, the one or more parameter sets, or both, including how a machine learning model and a corresponding parameter set is trained, a priority of each machine learning model, each parameter set, or both, and other information, may be provided to the network entity.

The network entity may transmit a message to the UE indicating the one or more machine learning models, the one or more parameter sets, or both, and one or more usage conditions the UE may use to select one of the machine learning models, one of the parameter sets, or both to generate the machine learning inference based on what input data is available, missing, or corrupted. The UE may select a machine learning model, a parameter set, or both based on a particular usage condition being satisfied, a priority of the machine learning model and parameter set, and other factors. In some examples, the UE may switch the machine learning model, the parameter set, or both the UE uses to generate the machine learning inference and transmit an indication of the model and/or parameter set switching to the network entity. In some examples, the UE may generate the machine learning inference using the selected machine learning model, the selected parameter set, or both, and the UE may transmit a report to the network entity, the report indicating the output of the inference, the machine learning model, the parameter set, or both selected to generate the interference, or both.

A method for wireless communication at a UE is described. The method may include receiving a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference, selecting a first machine learning model of the set of multiple machine learning models, a first parameter set of the set of multiple parameter sets, or both, for performing the machine learning inference based on a usage condition of the one or more usage conditions being satisfied, and transmitting a report indicating the machine learning inference that is generated by the first machine learning model or by using the first parameter set.

An apparatus for wireless communication at a UE is described. The apparatus may include a processor, memory coupled with the processor, and instructions stored in the memory. The instructions may be executable by the processor to cause the apparatus to receive a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference, select a first machine learning model of the set of multiple machine learning models, a first parameter set of the set of multiple parameter sets, or both, for performing the machine learning inference based on a usage condition of the one or more usage conditions being satisfied, and transmit a report indicating the machine learning inference that is generated by the first machine learning model or by using the first parameter set.

Another apparatus for wireless communication at a UE is described. The apparatus may include means for receiving a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference, means for selecting a first machine learning model of the set of multiple machine learning models, a first parameter set of the set of multiple parameter sets, or both, for performing the machine learning inference based on a usage condition of the one or more usage conditions being satisfied, and means for transmitting a report indicating the machine learning inference that is generated by the first machine learning model or by using the first parameter set.

A non-transitory computer-readable medium storing code for wireless communication at a UE is described. The code may include instructions executable by a processor to receive a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference, select a first machine learning model of the set of multiple machine learning models, a first parameter set of the set of multiple parameter sets, or both, for performing the machine learning inference based on a usage condition of the one or more usage conditions being satisfied, and transmit a report indicating the machine learning inference that is generated by the first machine learning model or by using the first parameter set.

Some examples of the method, apparatuses, and non-transitory computer-readable medium described herein may further include operations, features, means, or instructions for receiving the first message indicating a set of multiple priorities corresponding to the set of multiple machine learning models, the set of multiple parameter sets, or both and selecting the first machine learning model, the first parameter set, or both for performing the machine learning inference based on the first machine learning model, the first parameter set, or both being associated with a highest priority of the set of multiple priorities.

Some examples of the method, apparatuses, and non-transitory computer-readable medium described herein may further include operations, features, means, or instructions for receiving the first message indicating that a network node changed a priority of one or more of the set of multiple machine learning models, one or more of the set of multiple parameter sets, or both based on one or more performance indicators reported by the UE, where the first machine learning model, the first parameter set, or both may be selected based on the first message.

Some examples of the method, apparatuses, and non-transitory computer-readable medium described herein may further include operations, features, means, or instructions for selecting the first machine learning model, the first parameter set, or both for performing the machine learning inference based on the usage condition indicating to select the first machine learning model, the first parameter set, or both when the UE may be able to successfully receive input data from a network node and generating, by the first machine learning model or by using the first parameter set, the machine learning inference using the input data received from the network node.

Some examples of the method, apparatuses, and non-transitory computer-readable medium described herein may further include operations, features, means, or instructions for selecting the first machine learning model, the first parameter set, or both for performing the machine learning inference based on the usage condition indicating to select the first machine learning model, the first parameter set, or both when the UE fails to receive input data from a network node for a second machine learning model of the set of multiple machine learning models, a second parameter set of the set of multiple parameter sets, or both and transmitting the report indicating the machine learning inference and indicating the first machine learning model, the first parameter set, or both.

Some examples of the method, apparatuses, and non-transitory computer-readable medium described herein may further include operations, features, means, or instructions for generating, by the first machine learning model or by using the first parameter set, the machine learning inference using input data measured by the UE based on the usage condition indicating to select the first machine learning model, the first parameter set, or both when the UE measures the input data.

Some examples of the method, apparatuses, and non-transitory computer-readable medium described herein may further include operations, features, means, or instructions for transmitting a first feedback message indicating one or more statistics associated with switching between selecting the set of multiple machine learning models, the set of multiple parameter sets, or both.

Some examples of the method, apparatuses, and non-transitory computer-readable medium described herein may further include operations, features, means, or instructions for receiving a second feedback message indicating one or more statistics associated with switching between selecting the set of multiple machine learning models, the set of multiple parameter sets, or both.

Some examples of the method, apparatuses, and non-transitory computer-readable medium described herein may further include operations, features, means, or instructions for receiving the first message or a second message indicating the one or more usage conditions for selecting one of the set of multiple machine learning models, one of the set of multiple parameter sets, or both, where the one or more usage conditions include at least one of instructions for selecting one of the set of multiple machine learning models, one of the set of multiple parameter sets, or both when input data may be missing, or a priority corresponding to each machine learning model of the set of multiple machine learning models, each parameter set of the set of multiple parameter sets, or both for selecting one of the set of multiple machine learning models, one of the set of multiple parameter sets, or both.

In some examples of the method, apparatuses, and non-transitory computer-readable medium described herein, the instructions for selecting one of the set of multiple machine learning models, one of the set of multiple parameter sets, or both include an availability of input data, a usage scenario, an area scope, a model validity timer, a parameter set validity timer, a configuration of the UE, a configuration of a network node, a performance threshold, or any combination thereof.

In some examples of the method, apparatuses, and non-transitory computer-readable medium described herein, receiving the first message may include operations, features, means, or instructions for receiving the first message or a second message indicating configuration information for the set of multiple machine learning models, the set of multiple parameter sets, or both, where the configuration information indicates a set of alternative machine learning models of the set of multiple machine learning models, a set of alternative parameter sets of the set of multiple parameter sets, the one or more usage conditions, a priority corresponding to each machine learning model, a priority corresponding to each parameter set, or any combination thereof.

A method for wireless communication at a network node is described. The method may include transmitting a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference and receiving a report indicating the machine learning inference that is generated by a first machine learning model or by using a first parameter set selected by a UE based on a usage condition of the one or more usage conditions being satisfied.

An apparatus for wireless communication at a network node is described. The apparatus may include a processor, memory coupled with the processor, and instructions stored in the memory. The instructions may be executable by the processor to cause the apparatus to transmit a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference and receive a report indicating the machine learning inference that is generated by a first machine learning model or by using a first parameter set selected by a UE based on a usage condition of the one or more usage conditions being satisfied.

Another apparatus for wireless communication at a network node is described. The apparatus may include means for transmitting a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference and means for receiving a report indicating the machine learning inference that is generated by a first machine learning model or by using a first parameter set selected by a UE based on a usage condition of the one or more usage conditions being satisfied.

A non-transitory computer-readable medium storing code for wireless communication at a network node is described. The code may include instructions executable by a processor to transmit a first message indicating a set of multiple machine learning models, a set of multiple parameter sets, or both, and indicating one or more usage conditions for selecting one of the set of multiple machine learning models, one of the set of multiple parameter sets, or both, for performing a machine learning inference and receive a report indicating the machine learning inference that is generated by a first machine learning model or by using a first parameter set selected by a UE based on a usage condition of the one or more usage conditions being satisfied.

Some examples of the method, apparatuses, and non-transitory computer-readable medium described herein may further include operations, features, means, or instructions for transmitting the first message indicating a set of multiple priorities corresponding to the set of multiple machine learning models, the set of multiple parameter sets, or both.

Some examples of the method, apparatuses, and non-transitory computer-readable medium described herein may further include operations, features, means, or instructions for transmitting the first message indicating that the network node changed a priority of one or more of the set of multiple machine learning models, one or more of the set of multiple parameter sets, or both based on one or more performance indicators reported by the UE, where the first machine learning mode, the first parameter set, or both may be selected based on the first message.

Some examples of the method, apparatuses, and non-transitory computer-readable medium described herein may further include operations, features, means, or instructions for receiving the report indicating the machine learning inference and indicating that the UE selected the first machine learning model, the first parameter set, or both to generate the machine learning inference.

Some examples of the method, apparatuses, and non-transitory computer-readable medium described herein may further include operations, features, means, or instructions for transmitting a feedback message indicating one or more statistics associated with switching between the set of multiple machine learning models, the set of multiple parameter sets, or both.

Some examples of the method, apparatuses, and non-transitory computer-readable medium described herein may further include operations, features, means, or instructions for transmitting the first message or a second message indicating the one or more usage conditions for selecting one of the set of multiple machine learning models, one of the set of multiple parameter sets, or both, where the one or more usage conditions include at least one of instructions for selecting one of the set of multiple machine learning models, one of the set of multiple parameter sets, or both when input data may be missing, or a priority corresponding to each machine learning model of the set of multiple machine learning models, each parameter set of the set of multiple parameter sets for selecting one of the set of multiple machine learning models, one of the set of multiple parameter sets, or both.

In some examples of the method, apparatuses, and non-transitory computer-readable medium described herein, the instructions for selecting one of the set of multiple machine learning models, one of the set of multiple parameter sets, or both include an availability of input data, a usage scenario, an area scope, a model validity timer, a parameter set validity timer, a configuration of the UE, a configuration of a network node, a performance threshold, or any combination thereof.

In some examples of the method, apparatuses, and non-transitory computer-readable medium described herein, transmitting the first message may include operations, features, means, or instructions for transmitting the first message or a second message indicating configuration information for the set of multiple machine learning models, the set of multiple parameter sets, or both, where the configuration information indicates a set of alternative machine learning models of the set of multiple machine learning models, a set of alternative parameter sets of the set of multiple parameter sets, the one or more usage conditions, a priority corresponding to each machine learning model, a priority corresponding to each parameter set, or any combination thereof.

BRIEF DESCRIPTION OF THE DRAWINGS

FIGS. 14 through 19 show flowcharts illustrating methods that support conditional AI, machine learning model, and parameter set configurations in accordance with one or more aspects of the present disclosure.

DETAILED DESCRIPTION

Figure 1:
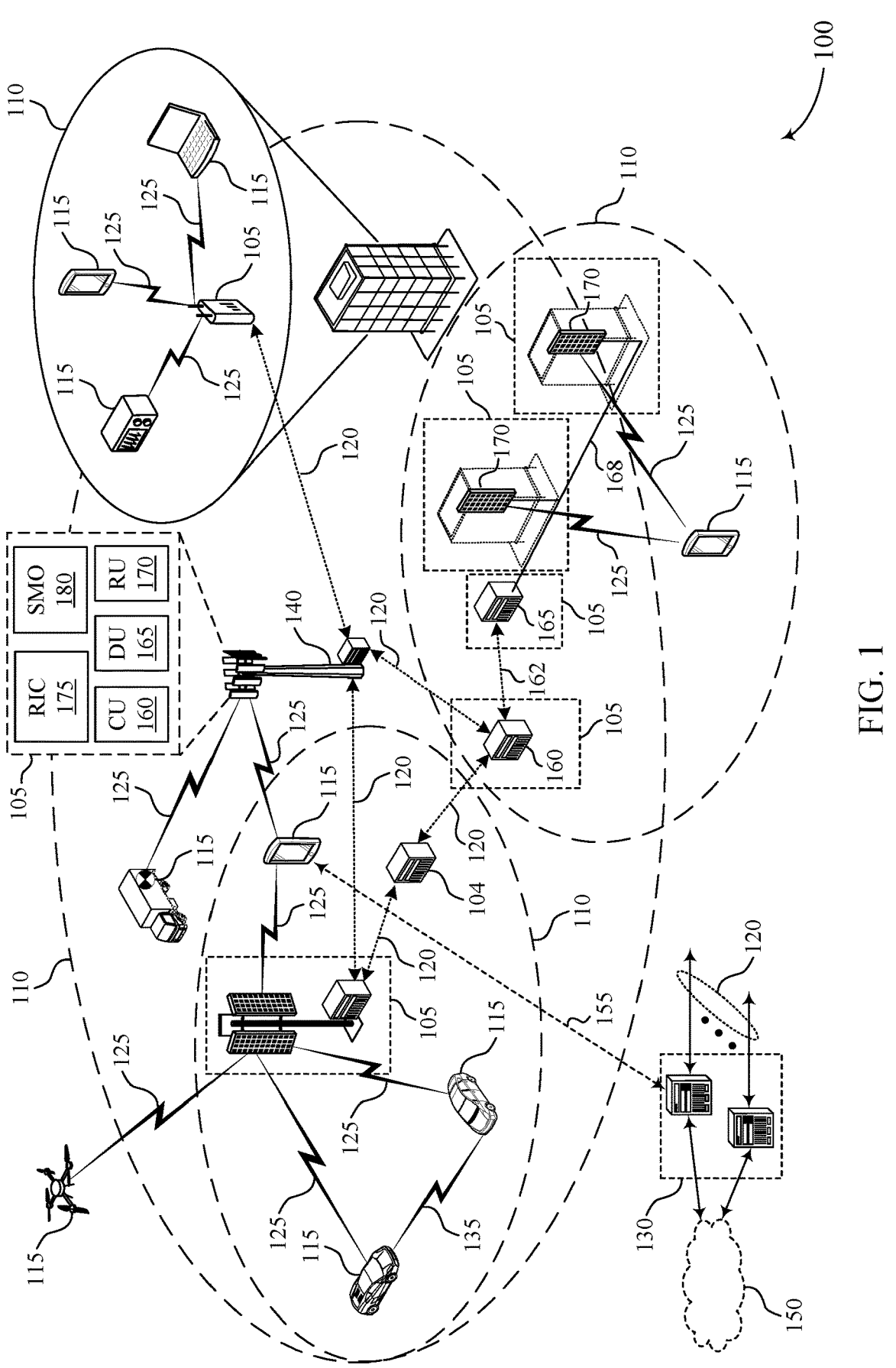
FIG. 1 illustrates an example of a wireless communications system that supports conditional artificial intelligence (AI), machine learning model, and parameter set configurations in accordance with one or more aspects of the present disclosure.

Some artificial intelligence (AI) and machine learning models may use defined sets of input and output parameters, for example, when operating in a cellular network. In some examples, network entities and user equipments (UEs) may use machine learning models in a wireless communications system (e.g., a fifth generation (5G) system) to make decisions based on learned data, which may improve efficiency, latency, and reliability of wireless applications. Some machine learning models may be trained using offline data, in which case the machine learning model may use different data processing methods to manage missing input values or corrupt input values for the model (e.g., to delete missing input values, to manually add missing input values). However, when a UE or a network entity (e.g., a network node) uses a machine learning model in a cellular network scenario, the unavailability of input parameters may result in incorrect predictions and high error rates in the output of the machine learning model. In a wireless communications system, input values may be unavailable for use in the machine learning model if corresponding input data is corrupt, if a network entity, a UE, or both are overloaded and unable to report input data to each other in a timely manner, or a combination thereof. As such, the machine learning model may lack input parameters for any given scenario, which may cause errors in the model's output and overall system performance degradation.

Techniques described herein may support conditional machine learning model and parameter set configurations, which may be used to manage missing or corrupt input data for a machine learning model and a parameter set to reduce errors in an output of the machine learning model. A parameter set may correspond to a weight of a machine learning model, or neural network weights of an AI or machine learning mode. In some examples, a single machine learning model may be associated with multiple machine learning parameters sets, and a usage condition may be used to select one of the parameters sets, based on what data is available, missing, corrupted, or any combination thereof. In some examples, the selected parameter set may be used used when running a particular machine learning model to generate a machine learning interference.

In some examples, one or more machine learning models and corresponding parameter sets may be trained such that a given machine learning model may be unaffected or less impacted by missing or corrupted input data. The one or more machine learning models, the one or more parameter sets, or both may use input data from the UE and the network entity, or input data just from the UE, to generate a machine learning inference. Machine learning inference may be a process of running live data points through a trained machine learning model and parameter set to calculate an output. Information about the one or more machine learning models, the one or more parameter sets, or both including how a machine learning model is trained to obtain associated parameter sets, a priority of each machine learning model and/or parameter set, and other information, may be provided to the network entity.

The network entity may configure model identifiers (IDs) and/or parameter sets together with usage conditions for multiple machine learning models, multiple parameter sets, or both. The network entity may transmit a message to the UE indicating the one or more machine learning models one or more parameter sets, or both, and one or more usage conditions the UE may use to select one of the machine learning models, one of the parameter sets, or both to perform the machine learning inference based on what input data is available, missing, or corrupted. That is, missing input data (e.g., from the network entity) may be one of the usage conditions. In addition, the network entity may configure other usage conditions. Examples of machine learning model and/or parameter set usage conditions for inference and training may include an availability of model input parameters, an area scope, a validity timer of a model, a validity timer of a parameter set, configurations of the network entity and the UE, key performance indicators (KPIs) of a model and associated parameter sets, a physical environment (e.g., indoors, outdoors, and other physical settings), or any combination thereof. The UE may select a machine learning model, a and parameter set, or both based on a particular usage condition being satisfied, a priority of the machine learning model, a priority of the parameter set, and other factors. In some examples, the UE may switch the machine learning model, the parameter set, or both the UE uses to perform the machine learning inference and transmit an indication of the model and/or parameter set switching to the network entity. In some examples, the UE may generate the machine learning inference using the selected machine learning model or the selected parameter set, and the UE may transmit a report to the network entity, the report indicating the output of the inference.

Aspects of the subject matter described herein may be implemented to realize one or more of the following potential improvements, among others. The techniques employed by the described network devices (e.g., UEs, network entities) may enable the UE to select a machine learning model, a parameter set, or both for performing a machine learning inference based on a usage condition being satisfied, which may enable more accurate machine learning model outputs. For example, the UE may select a model and parameter set that is trained to be agnostic to particular missing or corrupted input data, which may reduce incorrect predictions and errors in the outputs of the machine learning model and corresponding parameter set as it may be able to manage the missing or corrupted input data. In addition, the described techniques may enable the UE to perform model and/or parameter sets switching and report feedback about the model and/or parameter switching to the network entity, which may improve accuracy and efficiency of machine learning models and improve communications between the UE and the network entity, among other benefits.

Aspects of the disclosure are initially described in the context of wireless communications systems. Aspects of the disclosure are then described in the context of machine learning model and parameter set configurations and process flows. Aspects of the disclosure are further illustrated by and described with reference to apparatus diagrams, system diagrams, and flowcharts that relate to conditional AI, machine learning model, and parameter set configurations.

FIG. 1 illustrates an example of a wireless communications system 100 that supports conditional AI, machine learning model, and parameter set configurations in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support conditional AI, machine learning model, and parameter set configurations as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an ID for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some wireless communications systems 100 may support wireless devices such as UEs 115 and network entities 105 that use machine learning models or AI models to make decisions based on learned data, which may improve efficiency, latency, and reliability of wireless applications. Some machine learning models and AI models may use defined sets of input and output parameters, where one or more input values (e.g., corresponding to input parameters) may be used to predict an output value (e.g., corresponding to an output parameter). Some machine learning models may be trained using offline data. During offline training, a machine learning model may adapt different data processing methods to manage missing or corrupt input values.

In some examples, as result of machine learning or artificial intelligence model training, multiple parameter sets representing weights of machine learning or artificial intelligence model may be generated for different conditions. Examples conditions for generating different parameter sets for a given model may include an availability of model input parameters, an area scope, configurations of the network entity 105 and a UE 115, KPIs of a model, a physical environment (e.g., indoors, outdoors, and other physical settings), or any combination thereof.

In some examples, a machine learning model may operate in a cellular network or wireless communications scenario. Once the machine learning model is trained, the machine learning model may perform machine learning inference during which the trained model is used to draw conclusions from new input data. For example, during an inference procedure, the machine learning model may receive new input data and infer a new output from the new input data based on data the model is trained on (e.g., what the machine learning model has already learned). As such, for a machine learning model operating in a wireless communications system, during machine learning inference, the unavailability of input values may result in incorrect predictions and increased errors in the output of the machine learning model.

In the wireless communications system 100, the unavailability of input values may be based on an untimely delivery of data from a network entity 105 or a UE 115. For example, a RAN of the wireless communications system 100 may be overloaded and unable to report data in a timely manner to the UE 115, where a machine learning inference may be performed by a machine learning model and a parameter set at the UE 115 and the UE 115 may use a subset of data reported from the network entity 105 for the inference (e.g., input data reporting from the network entity 105 to the UE 115). Alternatively, the UE 115 may be overloaded and unable to report data in a time manner to the network entity 105, where the machine learning inference may be performed by a machine learning model and a parameter set at the network entity 105 and the network entity 105 may use a subset of data reported from the UE 115 for the inference (e.g., input data reporting from the UE 115 to the network entity 105). In some examples, the input data itself may be corrupt, such that the UE 115 or the network entity 105 may be unable to decode the reported input data (e.g., the input data may be corrupted by passing through a poor channel).

The wireless communications system 100 may support conditional machine learning model and parameter set configurations, which may be used to manage missing or corrupt input data for a machine learning model to reduce errors in an output of the machine learning model. In some examples, one or more machine learning models and parameter sets may be trained such that a given machine learning model, a given parameter set, or both may be unaffected by missing or corrupted input data. The one or more machine learning models, the one or more parameter sets, or both may use input data from a UE 115 and a network entity 105, or input data just from the UE 115, to generate a machine learning inference. Machine learning inference may be a process of running live data points through a trained machine learning model to calculate an output. Information about the one or more machine learning models, the one or more parameter sets, or both, including how a machine learning model is trained, a priority of each machine learning model, a priority of each parameter set, and other information, may be provided to the network entity 105.

The network entity 105 may configure model IDs together with usage conditions for multiple machine learning models, multiple parameter sets, or both. The network entity 105 may transmit a message to the UE 115 indicating the one or more machine learning models, the one or more parameter sets, or both, and usage conditions the UE 115 may use to select one of the machine learning models, one or the parameter sets, or both to perform the machine learning inference based on what input data is available, missing, or corrupted. Examples of machine learning model and/or parameter sets usage conditions for inference and training may include an availability of model input parameters, an area scope, a validity timer of a model, a validity timer of a parameter set, configurations of the network entity and the UE 115, KPIs of a model, a physical environment (e.g., indoors, outdoors, and other physical settings), or any combination thereof. The UE 115 may select a machine learning model, a parameter set, or both based on a particular usage condition being satisfied, a priority of the machine learning model and/or parameter sets, and other factors. In some examples, the UE 115 may switch the machine learning model and/or parameter set it uses to perform the machine learning inference and transmit an indication of the model and/or parameter set switching to the network entity 105. In some examples, the UE 115 may generate the machine learning inference using the selected machine learning model, the selected parameter set, or both and the UE 115 may transmit a report to the network entity 105, the report indicating the output of the inference.

Figure 2:
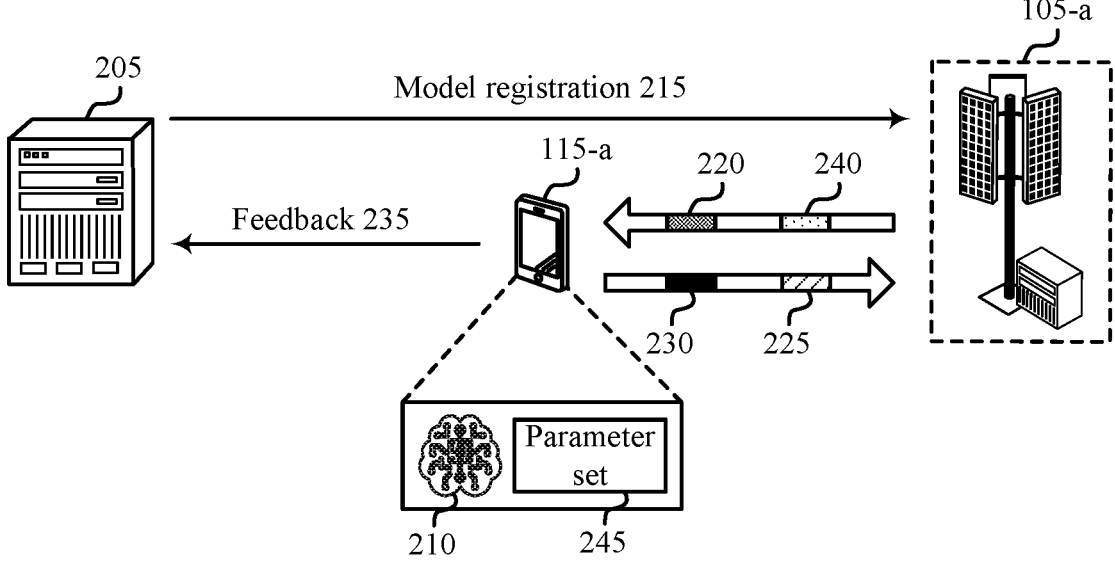
FIG. 2 illustrates an example of a wireless communications system that supports conditional AI, machine learning model, and parameter set configurations in accordance with one or more aspects of the present disclosure.
Figure 2:
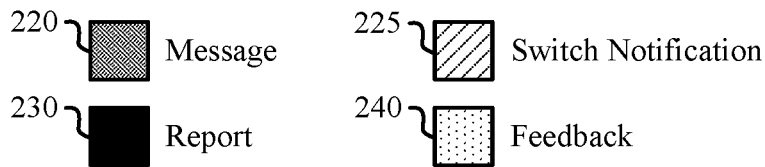

FIG. 2 illustrates an example of a wireless communications system 200 that supports conditional AI, machine learning model, and parameter set configurations in accordance with one or more aspects of the present disclosure. In some examples, the wireless communications system 200 may implement aspects of the wireless communications system 100 or may be implemented by aspects of the wireless communications system 100. For example, the wireless communications system 200 may include a UE 115-a and a network entity 105-a (e.g., a network node), which may examples of corresponding devices as described herein. In addition, the wireless communications system 200 may include a model designer 205. In some cases, the UE 115-a may use a machine learning model 210, a parameter set 245, or both, which the UE 115-a may select from a set of machine learning models and/or parameter sets based on one or more usage conditions.

As described herein, a parameter set may correspond to a weight of a machine learning model, or neural network weights of an AI or machine learning model. In some examples, a single machine learning model may be associated with multiple machine learning parameters sets, and a usage condition may be used to select one of the parameters sets, based on what data is available, missing, corrupted, or any combination thereof. In some examples, the selected parameter set may be used when running a particular machine learning model to generate a machine learning interference. As such, the UE 115-a may be configured a conditional configuration to change a parameter set while keeping a machine learning model the same.

The UE 115-a and the network entity 105-a may communicate via respective communication links, and the UE 115-a and the network entity 105-a may each communicate with the model designer 205. The model designer 205 may configure the UE 115-a (e.g., a cloud-based software) with a program for training one or more machine learning models and corresponding parameter sets, including the machine learning model 210 and the parameter set 245. In some examples, during model training, the model designer 205 may train the machine learning model 210 and the parameter set 245 such that the machine learning model 210 and the parameter set 245 may be agnostic to a scenario when input data is unavailable or corrupted. For example, when training the machine learning model 210 and the parameter set 245, the model designer 205 may consider a set of required input parameters and a set of optional input parameters (e.g., for which unavailability may have little to no effect on the performance of the machine learning model 210 and the parameter set 245, and availability may improve the performance of the machine learning model 210).

Upon training the machine learning model 210 and the parameter set 245, the model designer 205 may transmit an indication of a model registration 215 to the network entity 105-*a*. In some examples, the model registration 215 may indicate a model descriptor corresponding to the machine learning model 210, the parameter set 245, or both, which may include information regarding whether the machine learning model 210, the parameter set 245, or both is agnostic toward missing or corrupted input data, and information regarding which missing or corrupted input data the machine learning model 210, the parameter set 245, or both is agnostic toward. In addition, the model registration 215 may include information regarding data processing methods that may be used to manage missing inference input data.

In some examples, during the model registration 215, the model designer 205 may register alternative machine learning models, alternative parameter sets, or both (e.g., machine learning models and/or parameter sets that are alternative to the machine learning model 210 and the parameter set 245, which may be referred to as a baseline machine learning model and a baseline parameter set) and corresponding priorities of the alternative machine learning models and/or parameter sets. The alternative machine learning models, the alternative parameter sets, or both may refrain from using input data (e.g., including measurements and parameters) from the network entity 105. In some cases, the network entity 105-*a* may change the priorities of the alternative machine learning models, the alternative parameter sets, or both based on KPIs determined by the network entity 105-*a* or KPIs reported by the UE 115-*a*. In some examples, the model registration 215 may include a list of missing input data to which the machine learning model 210, the parameter set 245, or both (which were trained by the model designer 205) is agnostic. For example, the model registration 215 may include a list of input parameters that lack a significant impact on the performance of the machine learning model 210, the parameter set 245, or both.

In response to receiving the indication of the model registration 215 from the model designer 205, the network entity 105-*a* may perform model configuration to configure the machine learning model 210, the parameter set 245, or both and one or more alternative machine learning models, one or more alternative parameter sets, or both for use by the UE 115-*a*. The network entity 105-*a* may use conditional model and parameter set configuration, where for each configured machine learning model and parameter set, the network entity 105-*a* may additionally configure one or more usage conditions and a priority. In some examples, the network entity 105-*a* may define input inference data availability-based configurations in the conditional model and parameter set configuration. Additionally, the network entity 105-*a* may define a performance-based configuration, a scenario-based configuration (e.g., a configuration that is based on a RAT, a physical environment of the wireless communications system 200, antenna port properties, and other scenarios), or any combination thereof.

In some examples, the usage conditions for selecting a machine learning model, a parameter set, or both may include instructions used for selecting a particular one of the machine learning models and/or parameter sets when some input data is missing, a priority corresponding to each machine learning model, each parameter set, or both used for selecting a particular one of the machine learning models, a particular one of the machine learning models, or both, or a combination thereof. In addition, the instructions for selecting the machine learning model, the parameter set, or both may include an availability of input data (e.g., from the UE 115-*a*, the network entity 105-*a*, or both), a usage scenario, an area scope, a model validity timer, a parameter set validity timer, a configuration of the UE 115-*a*, a configuration of the network entity 105-*a*, a performance threshold, or any combination thereof.

In some examples, the network entity 105-*a* may configure the machine learning model 210, the parameter set 245, or both and the one or more alternative machine learning models, the one or more alternative parameter sets, or both that the UE 115-*a* may use depending on which input data is missing for a given machine learning model. For example, if machine learning inference uses input data from the network entity 105-*a*, the network entity 105-*a* may configure the machine learning model 210, the parameter set 245, or both to use input data from the UE 115-*a* and the network entity 105-*a*. If the network entity 105-*a* and the UE 115-*a* both provide the required input data for the machine learning model 210, the parameter set 245, or both, then the UE 115-*a* may use the machine learning model 210, the parameter set 245, or both. However, if the network entity 105-*a* fails to provide the required input data to the UE 115-*a* for the machine learning model 210, the parameter set 245, or both, making the machine learning model 210, the parameter set 245, or both unavailable, the UE 115-*a* may use an alternative machine learning model and/or parameter set configured by the network entity 105-*a* that may just use input data from the UE 115-*a*. The alternative machine learning models and/or parameter sets configured by the network entity 105-*a* are described in detail with reference to FIG. 3.

The UE 115-*a* may receive a message 220 from the network entity 105-*a* indicating a set of machine learning models, a set of parameter sets, or both (e.g., including the machine learning model 210, the parameter set 245, or both and one or more alternative machine learning models, one or more alternative parameter sets, or both configured by the network entity 105-*a*) and indicating the usage conditions for selecting one of the machine learning models and/or parameter sets for performing the machine learning inference. The UE 115-*a* may load the set of machine learning models and/or parameter sets for the inference, and the UE 115-*a* may select a machine learning model, a parameter set, or both for the machine learning inference based on a corresponding usage condition being satisfied. For example, the UE 115-*a* may select the machine learning model 210, the parameter set 245, or both if one or both has the highest priority for which all input inference data are available and authentic, or based on an availability of input data. In some examples, the UE 115-*a* may select the machine learning model 210, the parameter set 245, or both based on a usage condition indicating to select the machine learning model 210, the parameter set 245, or both when the UE 115-*a* is able to successfully receive and decode input data from the network entity 105-*a*. Alternatively, the UE 115-*a* may select the machine learning model 210, the parameter set 245, or both based on a usage condition indicating to select the machine learning model 210, the parameter set 245, or both when the UE 115-*a* fails to receive input data from the network entity 105-*a* for an alternative machine learning model. If the usage conditions of multiple machine learning models and/or parameter sets (e.g., the machine learning model 210, the parameter set 245, or both and one or more alternative machine learning models, one or more alternative machine learning models, or both) are met, the UE 115-*a* may select the machine learning model 210, the parameter set 245, or both based on the priorities of the models and/or parameter sets (e.g., where the machine learning model 210, the parameter set 245, or both may have a highest priority).

In some examples, the UE 115-*a* may perform model and/or parameter set switching for different inference occasions. For example, the UE 115-*a* may be configured to perform a first machine learning inference during a first inference occasion. The UE 115-*a* may select the machine learning model 210, the parameter set 245, or both to generate the first machine learning inference based on the UE 115-*a* receiving and successfully decoding input data from the network entity 105-*a*, where the network entity-reported data and input data measured by the UE 115-*a* may be used in the machine learning model 210, the parameter set 245, or both. The UE 115-*a* may generate the machine learning inference using the selected machine learning model 210, the parameter set 245, or both. In some examples, the UE 115-*a* may be configured to perform a second machine learning inference during a second inference occasion. However, the UE 115-*a* may fail to receive the input data from the network entity 105-*b* for the second inference occasion, and as such, the UE 115-*a* may select an alternative machine learning model, an alternative parameter set, or both for generating the machine learning inference. Because the UE 115-*a* switched from using the machine learning model 210, the parameter set 245, or both in the first inference occasion to using an alternative machine learning model, an alternative parameter set, or both in the second inference occasion, the UE 115-*a* may transmit a switch indication 225 to the network entity 105-*a* indicating the switch (e.g., by indicating IDs of the machine learning models and/or parameter sets). That is, the UE 115-*a* may indicate which model, parameter set, or both the UE 115-*a* used for obtaining a particular inference output in the switch indication 225 transmitted to the network entity 105-*a*.

In some cases, the UE 115-*a* may use the machine learning model 210, the parameter set 245, or both to generate a machine learning inference output, and the UE 115-*a* may transmit a report 230 to the network entity 105-*a* indicating the generated machine learning inference output. In addition, the UE 115-*a* may send feedback 235 to the model designer 205 indicating some statistics about the model and/or parameter set switching. For example, the feedback 235 may include information such as a rate at which the UE 115-*a* performed model and/or parameter set switching, a cause of the model and/or parameter set switching (e.g., indicating that the UE 115-*a* performed the model and/or parameter set switching based on an absence of parameters), and any other system KPIs obtained by the UE 115-*a* or the network entity 105-*a* based on the model and/or parameter set switching. In addition, the UE 115-*a* may receive feedback 240 from the network entity 105-*a*, which may include information about the model and/or parameter set switching from the perspective of the network entity 105-*a* (e.g., based on KPIs determined by the network entity 105-*a*). The UE 115-*a* may then transmit the feedback 235 to the model designer 205, where the feedback 235 may include the feedback generated from the UE 115-*a* and the feedback 240 from the network entity 105-*a*.

The described techniques may be used for a machine learning model, a parameter set, or both operating at the UE 115-*a* that may use some input data at the UE 115-*a* from the network entity 105-*a* or some input data at the network entity 105-*a* from the UE 115-*a*. For example, the UE 115-*a* may use the described techniques for beam management inference procedures. The UE 115-*a* may expect to receive some information from the network entity 105-*b* regarding directionality, beam shape, and other features of transmit or receive beams associated with the network entity 105-*a*. The network entity 105-*a* may provide input data to the UE 115-*a* including the beam parameters, and the UE 115-*a* may use the input data in the machine learning model 210, the parameter set 245, or both (e.g., which may use the input data from the network entity 105-*a*) to generate an inference output, which may correspond to a beam prediction or beam selection from a set of possible beams that the UE 115-*a* may use for transmission or reception.

Additionally, or alternatively, the UE 115-*a* may use the described techniques to perform a machine learning inference when the network entity 105-*a* configures performance-based usage conditions for selecting a machine learning model, a parameter set, or both. For example, the latency of performing the inference may be based on power capabilities of the UE 115-*a*. If the UE 115-*a* operates in a low-power state, the UE 115-*a* may be unable to run a complex machine learning model and parameter set, and obtain an inference output in a timely manner. As such, the overall performance of the inference procedure may be degraded. To improve the overall performance of the inference procedure when the UE 115-*a* is operating in a low power mode, the UE 115-*a* may use model and/or parameter set switching to select a different machine learning model, a different parameter set, or both for obtaining the inference output which may be less complex and therefore, use less time and less power to run. As such, the UE 115-*a* may switch which machine learning model, parameter set, or both it uses to obtain an inference output based on a power mode the UE 115-*a* is operating in.

Additionally, or alternatively, the UE 115-*a* may use the machine learning model 210, the parameter set 245, or both for RF fingerprinting (RFFP). RFFP may be used to identify a transmitting device to a passive receiving device, and may be used for device authentication and access control to reduce the vulnerability of 5G wireless communication systems. In UE-based RFFP, a neural network may be trained for RFFP and made available at the UE 115-*a* for inference. The neural network may take channel observations derived from a downlink positioning reference signal (PRS) as an input to determine a position of the UE 115-*a*. The channel observations may be from one TRP (e.g., a single-cell RFFP) or from multiple TRPs (e.g., a multi-cell RFFP). In such cases of UE-based RFFP, the machine learning model 210, the parameter set 245, or both may refrain from using input data from the network entity 105.

In some cases, the RFFP may be network entity-based, in which the network entity 105 may utilize uplink channel observations from one or more TRPs to derive the position of the UE 115. In such cases of network entity-based RFFP, the machine learning model 210, the parameter set 245, or both may refrain from using input data from the UE 115. Alternatively, for UE-assisted RFFP, the neural network may be split in such a way that a part of the machine learning model 210, the parameter set 245, or both may be executed at the UE 115, and the rest of the machine learning model and/or parameter set may be executed at the neural network. As such, the machine learning model 210, the parameter set 245, or both may use input data or at least some input parameters transmitted from the UE 115 to the network entity 105. In some cases, for network-assisted RFFP, the network entity 105 may observe the uplink channel from one or more TRPs and transmit the derived channel features of the UE 115. The UE 115 may execute the neural network and derive its final position using the network-reported features. As such, the machine learning model 210, the parameter set 245, or both may use input data or at least some input parameters transmitted from the network entity 105 to the UE 115. In some examples, different machine learning models and/or parameter sets associated with different techniques may have different accuracy, and a machine learning model and/or parameter set may be desired even with additional signaling used to report input data.

By selecting a machine learning model, a parameter set, or both from multiple configured machine learning models, parameter sets, or both to generate an inference output, communications between the UE 115-*a* and the network entity 105-*a* may be improved. For example, the UE 115-*a* may select a machine learning model and parameter set that is trained to be agnostic to particular missing or corrupted input data, which may reduce incorrect predictions and errors in the outputs of the machine learning model and parameter set as it may be able to manage the missing or corrupted input data. In addition, the described techniques may enable the UE 115-*a* to perform model and/or parameter set switching and report feedback about the model and/or parameter set switching to the network entity 105-*a*, which may improve accuracy and efficiency of machine learning models and improve communications between the UE and the network entity, among other benefits.

Figure 3:
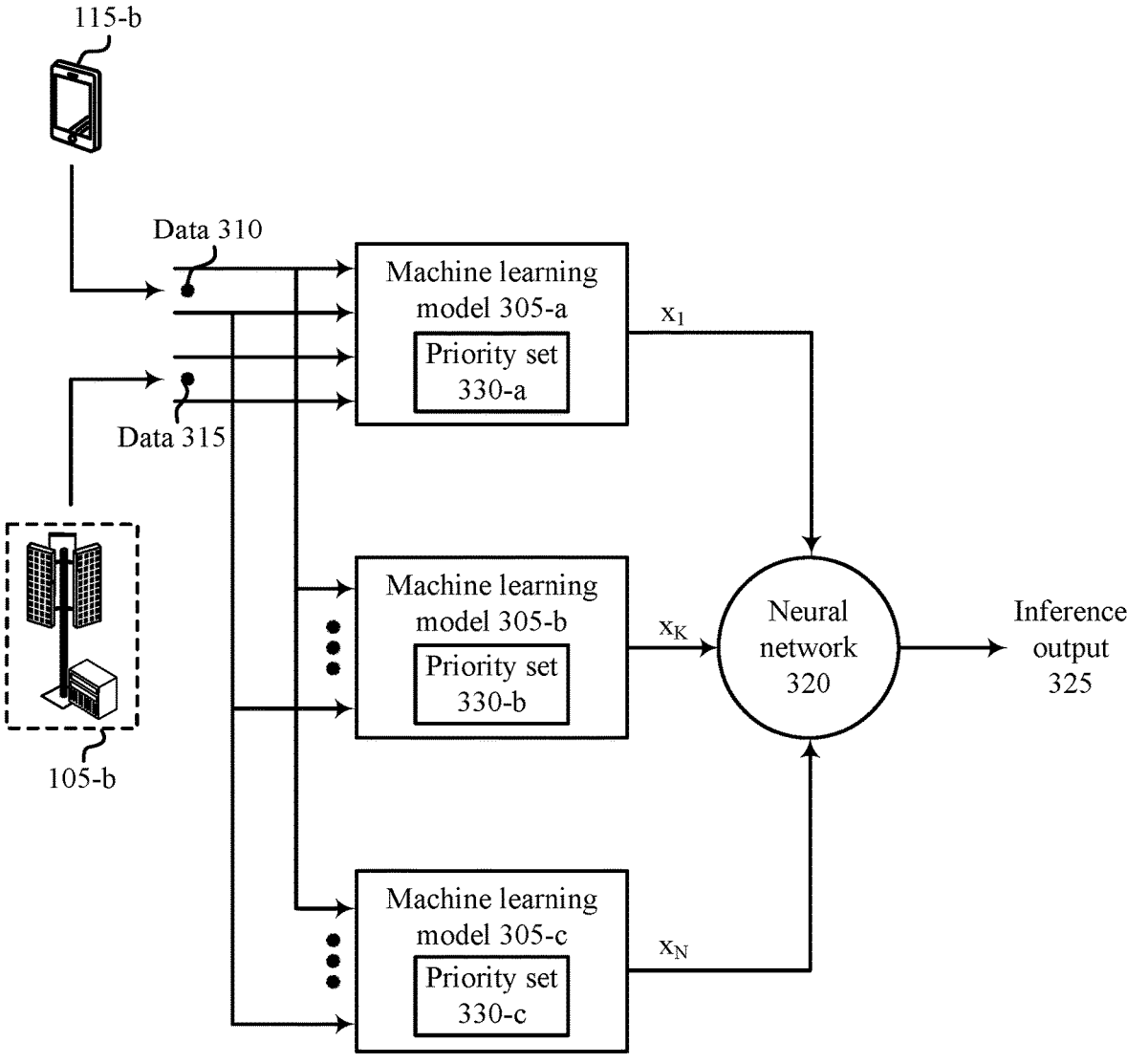
FIG. 3 illustrates an example of a machine learning model and parameter set configuration that supports conditional AI, machine learning model, and parameter set configurations in accordance with one or more aspects of the present disclosure.

FIG. 3 illustrates an example of a machine learning model and parameter set configuration 300 that supports conditional AI, machine learning model, and parameter set configurations in accordance with one or more aspects of the present disclosure. In some examples, the machine learning model and parameter set configuration 300 may implement aspects of the wireless communications systems 100 and 200 or may be implemented by aspects of the wireless communications systems 100 and 200. For example, the machine learning model and parameter set configuration 300 may include a UE 115-*b* and a network entity 105-*b* (e.g., a network node), which may be examples of corresponding devices as described herein. In some examples, the network entity 105-*b* may configure a machine learning model 305, a parameter set 330, or both for use by the UE 115-*b*, where each machine learning model 305 and each parameter set 330 may use input data from the UE 115-*b*, the network entity 105-*b*, or a combination thereof.

As described herein, the network entity 105-*b* may receive model registration information from a model designer for a set of machine learning models 305 and a set of parameter sets 330 trained by the model designer. Upon receiving the model registration information (e.g., configuration information for the set of machine learning models 305 and/or the set of parameter sets 330), the network entity 105-*b* may use conditional model and parameter set configuration techniques to configure the machine learning models 305, the parameter sets 330, or both, priorities of the machine learning models 305 and parameter sets 330, and usage conditions for the machine learning models 305 and parameter sets 330. For example, the network entity 105-*b* may configure a machine learning model 305-*a*, a parameter set 330-*a*, or both that may use data 310 measured by the UE 115-*b* and data 315 reported from the network entity 105-*b* for machine learning inference. Alternatively, the network entity 105-*b* may configure a machine learning model 305-*b*, a parameter set 330-*b*, or both that may use just the data 310 measured by and reported from the UE 115-*b* for machine learning inference. In some examples, the network entity 105-*b* may configure a machine learning model 305-*c*, a parameter set 330-*c*, or both which may use the data 310, the data 315, or a combination thereof according to a legacy procedure.

For example, the UE 115-*b* may report the data 310 and the network entity 105-*b* may report the data 315 for the machine learning model 305-*a*, the parameter set 330-*a*, or both. The machine learning model 305-*a* and the parameter set 330-*a* may use the data 310 and the data 315 to generate an output $x_1$, which may be input into a neural network 320 to generate the inference output 325. In some examples, the neural network 320 may include a function such as $f(x_1, \ldots, x_N)=I_1 x_1 + \ldots + I_N x_N$; such that $I_1 + \ldots + I_N = 1$. In some examples, if the data 315 reported from the network entity 105-*b* is unavailable in a timely manner, the UE 115-*b* may provide the data 310 to the machine learning model 305-*b*, the parameter set 330-*b*, or both. The machine learning model 305-*b*, the parameter set 330-*b*, or both may use the data 310 to generate an output $x_K$, which may be input into the neural network 320 to generate the inference output 325. Alternatively, if the UE 115-*b* is unable to collect and produce the data 310 for the machine learning model 305-*b*, the parameter set 330-*b*, or both in a timely manner, the machine learning model 305-*c*, the parameter set 330-*c*, or both may use the data 315 reported from the network entity 105-*b* to generate an output $x_N$, which may be input into the neural network 320 to generate the inference output 325. As such, the UE 115-*b* may use different machine learning models 305 and different parameter sets 330 based on what the UE 115-*b* is using the machine learning model 305, the parameter set 330, or both to determine, based on what input data is available for the machine learning model 305, the parameter set 330, or both, and based on other usage conditions, as described herein.

In some examples, the UE 115-*b* may select a machine learning model 305, a parameter set 330, or both based on the usage conditions configured by the network entity 105-*b* for each machine learning model 305, each parameter set 330, or both. The usage conditions may include an availability of input data, which may include a list containing acceptable missing input data (e.g., input data for which a machine learning model 305 and a parameter set 330 may be agnostic toward) and a list containing non-acceptable missing input data (e.g., input data for which no machine learning model 305 or parameter set 330 may be agnostic toward). For example, the data 315 reported from the network entity 105-*b* may be on the list of acceptable missing input data as the machine learning model 305-*b*, the parameter set 330-*b*, or both may run using just the data 310 from the UE 115-*b*, however the data 310 may be on the list of nonacceptable missing input data as the machine learning model 305-*a* and the parameter set 330-*a* and the machine learning model 305-*b* and the parameter set 330-*b* may use the data 310.

Additionally, or alternatively, the usage conditions may indicate a usage scenario associated with selection of a machine learning model and parameter set by the UE 115-*b*. For example, the usage scenario may refer to the UE 115-*b* operating indoors or outdoors, or the usage scenario may refer to an elevation of the UE 115-*b* (e.g., if the UE 115-*b* were in a non-terrestrial network). In some examples, the usage conditions may include an area scope, which may include a cell, a public land mobile network (PLMN), a radio network controller (RNC), a carrier frequency list, and the like. Additionally, or alternatively, the usage conditions may include a validity timer for a machine learning model 305, a parameter set 330, or both, which may represent a duration of time for which the usage of a given machine learning model 305, a corresponding parameter set 330, or both may be considered valid.

In some examples, the usage conditions may include configuration information for the UE 115-*b*, the network entity 105-*b*, or both, which may impact which machine learning model 305, which parameter set 330, or both the UE 115-*b* selects. For example, the configuration information may include a quantity and spatial layout of antenna ports, shapes of transmit and receive beams, a mobility status of the UE 115-*b* (e.g., low, medium, or high mobility), a doppler spread, and a subcarrier spacing, among other configuration information corresponding to the UE 115-*b*, the network entity 105-*b*, or both. Additionally, or alternatively, the usage conditions may be performance based. For example, the usage conditions may include a threshold for acceptable performance or a hysteresis of acceptable performance corresponding to an output of a machine learning model 305, a parameter set 330, or both. Each usage condition may be applied individually or in any combination by the UE 115-*b* for selecting which machine learning model 305 and parameter set 330 of a set of machine learning models and/or parameter sets that the UE 115-*b* selects.

Figure 4:
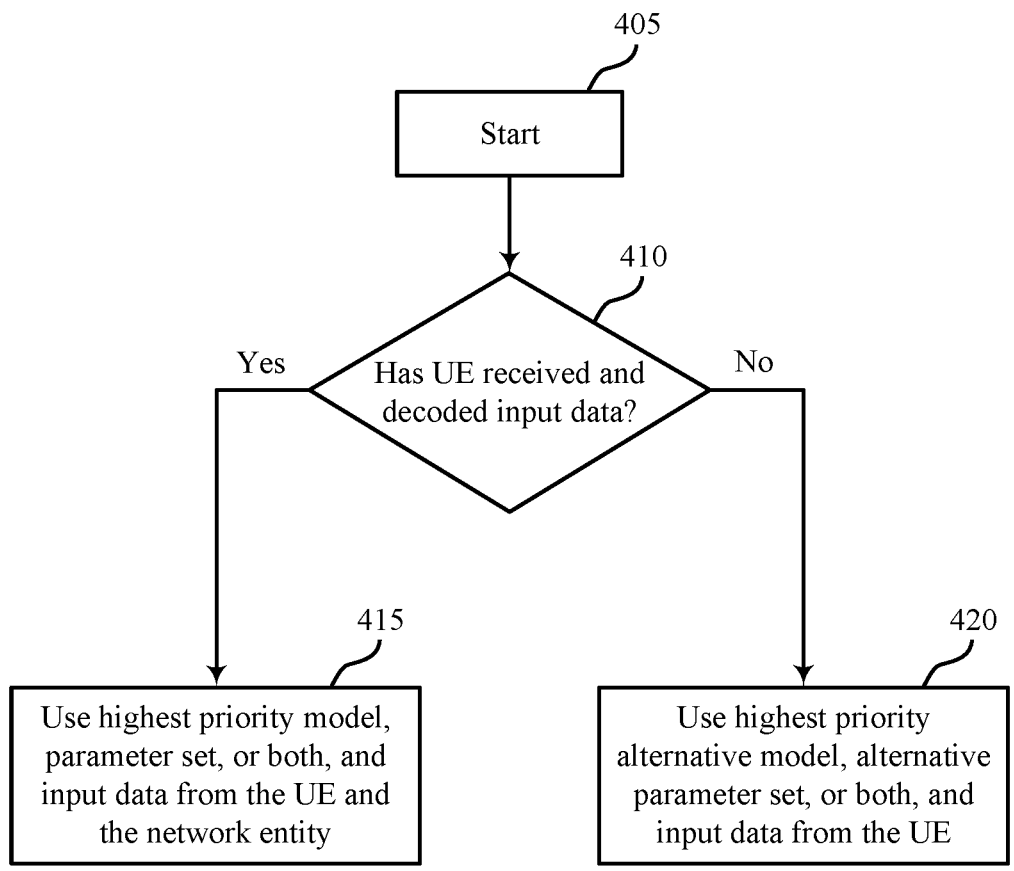
FIGS. 4 and 5 illustrate examples of process flows that support conditional AI, machine learning model, and parameter set configurations in accordance with one or more aspects of the present disclosure.

FIG. 4 illustrates an example of a process flow 400 that supports conditional AI, machine learning model, and parameter set configurations in accordance with one or more aspects of the present disclosure. In some examples, the process flow 400 may implement aspects of the wireless communications systems 100 and 200, or may be implemented by aspects of the wireless communications systems 100 and 200. For example, a UE, which may be an example of a UE 115 as described herein, may use the process flow 400 to select a machine learning model, a parameter set, or both based on one or more usage conditions corresponding to the machine learning models, the parameter sets, or both.

As described herein, a model designer may train a set of machine learning models and/or parameter sets. In some examples, the machine learning models and/or parameter sets may be trained such that they may be agnostic to missing or corrupted input data. For example, a machine learning model may use input data from a UE and a network entity, while a different machine learning model may use input data from a UE. The model designer may transmit an indication of model registration to the network entity, which the network entity may use to configure multiple machine learning models, multiple parameter sets, or both for the UE. In addition to the machine learning models and/or parameter sets, the network entity may configure priorities of the machine learning models, the parameter sets, or both, as well as usage conditions for selecting the machine learning models, the parameter sets, or both. The network entity may transmit a message to the UE indicating the configured machine learning models and/or parameter sets, the priorities, and the usage conditions.

At 405, the UE may begin an inference occasion during which the UE is to select a machine learning model, a parameter set, or both to perform a machine learning inference using some input data. During an inference procedure, a machine learning model and a parameter set may receive new input data and predict a new output from the new input data based on what it is trained on (e.g., what the machine learning model and parameter set has already learned).

At 410, the UE may determine whether the UE has received and successfully decoded input data reported from the network entity. That is, the UE may evaluate a usage condition that corresponds to the availability of input data (e.g., a list of acceptable missing input data, a list of non-acceptable missing input data) that may be measured by the UE or reported by the network entity. In some examples, the process at 410 may be based on any other usage condition, such as a usage scenario, an area scope, a configuration of the UE or the network entity, or any other usage condition.

At 415, if the UE has received and successfully decoded the input data from the network entity, the UE may select a machine learning model, a parameter set, or both with a highest priority for which all required input data from the UE and the network entity are available and successfully decoded. That is, the UE may select the baseline machine learning model, the baseline parameter set, or both that uses input data from the UE and the network entity to generate an inference output. The UE may perform the machine learning inference using the input data measured by the UE and reported by the network entity. In some examples, the UE may transmit a message to the network entity indicating an ID associated with a machine learning model, the parameter set, or both used for the machine learning inference if the UE performed model and/or parameter set switching and the machine learning model and/or parameter set used for the machine learning difference was different than that selected by the UE. The UE may transmit the message indicating an ID associated with a machine learning model, a parameter set, or both at the beginning of each inference occasion, or the UE may transmit the message as a part of a routine performance measurement.

Alternatively, at 420, if the UE failed to receive input data from the network entity or if the UE received the input data from the network entity but failed to successfully decode the input data, the UE may select an alternative machine learning model, an alternative machine learning model, or both with a highest priority for which all required input data is available at the UE. That is, the UE may select an alternative machine learning model, an alternative parameter set, or both that uses input data measured by the UE only. The UE may perform the machine learning inference using the UE-measured input data. In some examples, the UE may transmit a message to the network entity indicating an ID associated with a machine learning model, a parameter set, or both used for the machine learning inference if the UE performed model and/or parameter set switching and the machine learning model and parameter set used for the machine learning difference was different than that selected by the UE.

Figure 5:
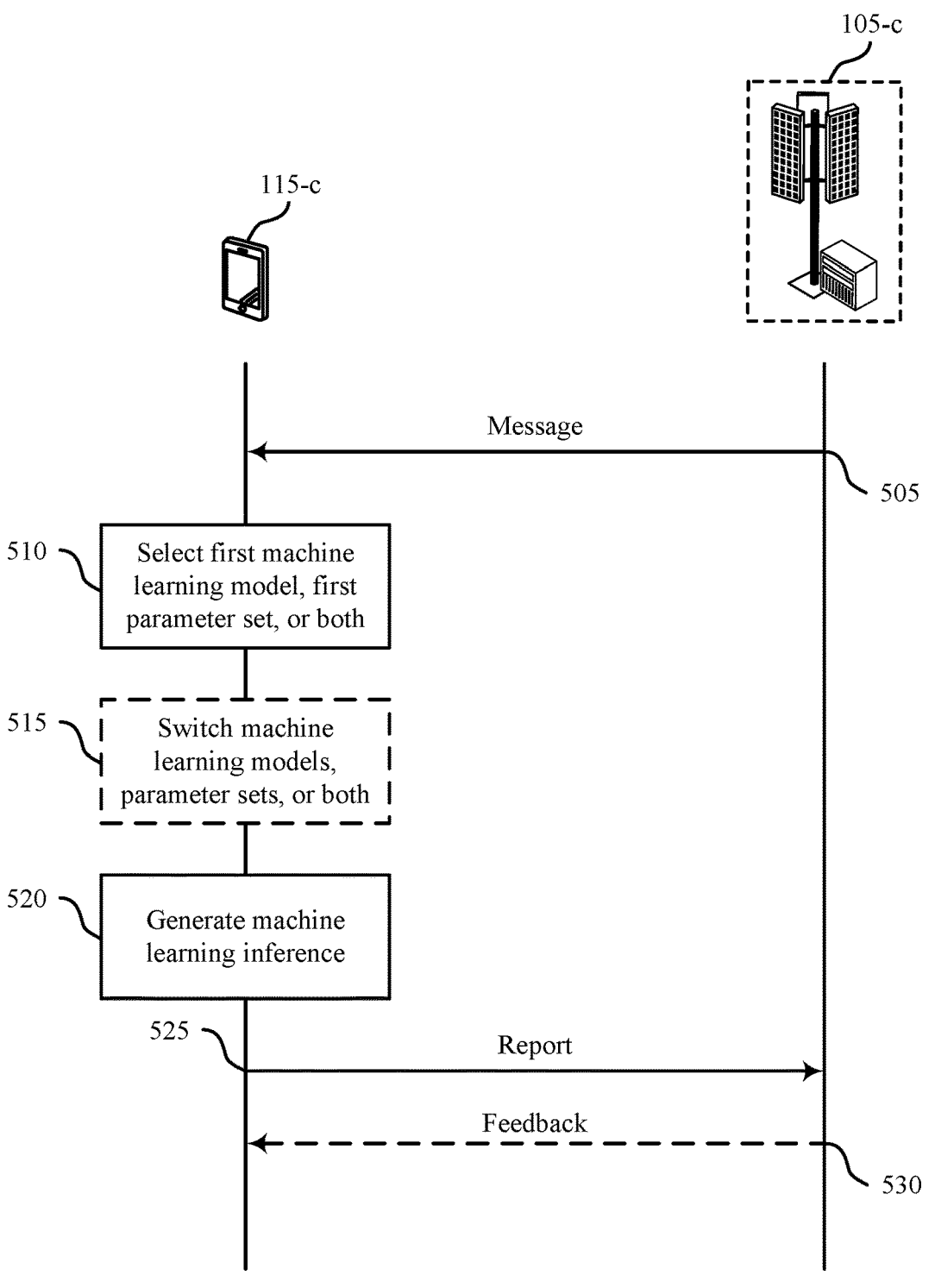

FIG. 5 illustrates an example of a process flow 500 that supports conditional AI, machine learning model, and parameter set configurations in accordance with one or more aspects of the present disclosure. The process flow 500 may implement aspects of wireless communications systems 100 and 200, or may be implemented by aspects of the wireless communications system 100 and 200. For example, the process flow 500 may illustrate operations between a UE 115-*c* and a network entity 105-*c* (e.g., a network node), which may be examples of corresponding devices described herein. In the following description of the process flow 500, the operations between the UE 115-*c* and the network entity 105-*c* may be transmitted in a different order than the example order shown, or the operations performed by the UE 115-*c* and the network entity 105-*c* may be performed in different orders or at different times. Some operations may also be omitted from the process flow 500, and other operations may be added to the process flow 500.

At 505, the UE 115-c may receive, from the network entity 105-c, a first message indicating a set of machine learning models, a set of parameter sets, or both, and indicating one or more usage conditions for selecting one of the machine learning models, one or the parameter sets, or both for performing a machine learning inference. In some examples, the usage conditions may include an availability of input data, a usage scenario, and an area scope, among other usage conditions.

At 510, the UE 115-c may select a first machine learning model, a first parameter set, or both for performing the machine learning inference based on a usage condition of the one or more usage conditions being satisfied. For example, if the UE 115-c receives input data from the network entity 105-c, and the UE 115-c measures its own input data, then the UE 115-c may select the first machine learning model, the first parameter set, or both, which may use input data from both the UE 115-c and the network entity 105-c. Alternatively, if the UE 115-c fails to receive input data from the network entity 105-c, or if the UE 115-c receives the input data from the network entity 105-c but fails to successfully decode the input data, the UE 115-c may select the first machine learning model the first parameter set, or both, which may use input data from just the UE 115-c.

At 515, the UE 115-c may switch the first machine learning model, the first parameter set, or both to a second machine learning model, a second parameter set, or both for example, based on different usage conditions being satisfied for different inference occasions.

At 520, the UE 115-c may use the first machine learning model, the first parameter set, or both to generate the machine learning inference using the input data received from the UE 115-c, the input data measured by the UE 115-c, or both. As such, the UE 115-c may use the first machine learning model, the first parameter set, or both to generate the machine learning inference based on the first machine learning model, the first parameter set, or both satisfying a usage condition that the first machine learning model, the first parameter set, or both may use input data from the UE 115-c and the network entity 105-c.

At 525, the UE 115-c may transmit, to the network entity 105-c, a report indicating the machine learning inference generated using the first machine learning model or the first parameter set, an ID of the first machine learning model, the first parameter set, or both an indication of why the first machine learning model, the first parameter set, or both was selected (e.g., if first machine learning model, the first parameter set, or both is agnostic to certain date the UE 115-a was missing when selecting between the set of machine learning models, the set of parameter sets, or both), or any combination thereof.

At 530, the UE 115-c may receive, from the network entity 105-c, a feedback message indicating one or more statistics associated with the UE 115-c switching between the selecting the first machine learning model, the first parameter set, or both, and a second machine learning model, a second parameter set, or both. For example, the feedback message may indicate the rate at which the UE 115-c performed the model and/or parameter set switching and a cause of the model and/or parameter set switching.

Figure 6:
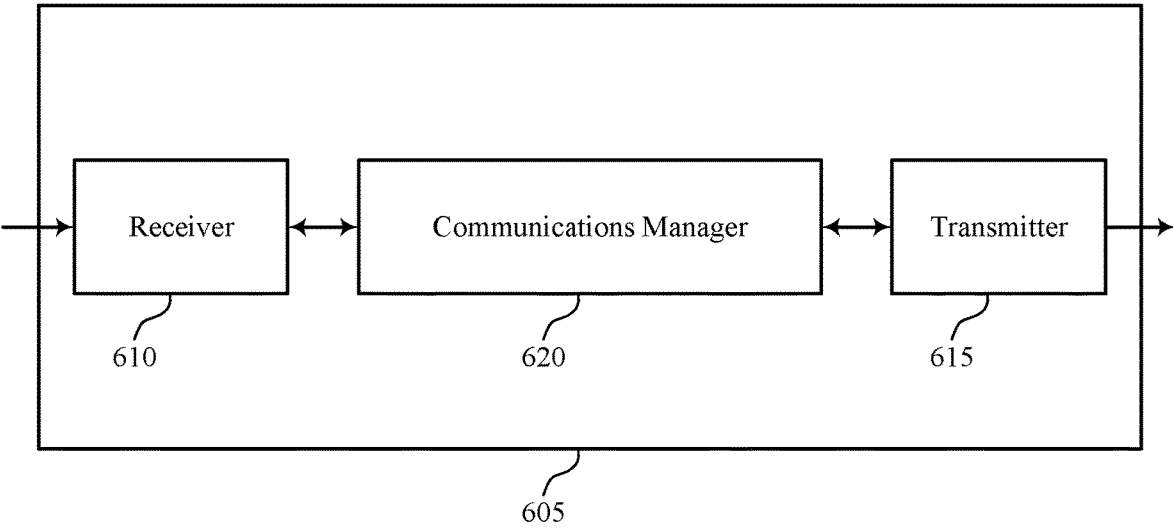
FIGS. 6 and 7 show block diagrams of devices that support conditional AI, machine learning model, and parameter set configurations in accordance with one or more aspects of the present disclosure.
Figure 6:

FIG. 6 shows a block diagram 600 of a device 605 that supports conditional AI, machine learning model, and parameter set configurations in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to conditional AI, machine learning model, and parameter set configurations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to conditional AI, machine learning model, and parameter set configurations). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of conditional AI, machine learning model, and parameter set configurations as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for receiving a first message indicating a set of multiple machine learning models, a set of multiple parameter sets, or both and indicating one or more usage conditions for selecting one of the set of multiple machine learning models, one of the set of multiple parameter sets, or both for performing a machine learning inference. The communications manager 620 may be configured as or otherwise support a means for selecting a first machine learning model, a first parameter set, or both for performing the machine learning inference based on a usage condition of the one or more usage conditions being satisfied. The communications manager 620 may be configured as or otherwise support a means for transmitting a report indicating the machine learning inference that is generated by the first machine learning model or by using the first parameter set.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for selecting machine learning models, parameter sets, or both based on usage conditions, which may reduce errors and false predictions in machine learning model outputs and improve machine learning inference results.

Figure 7:
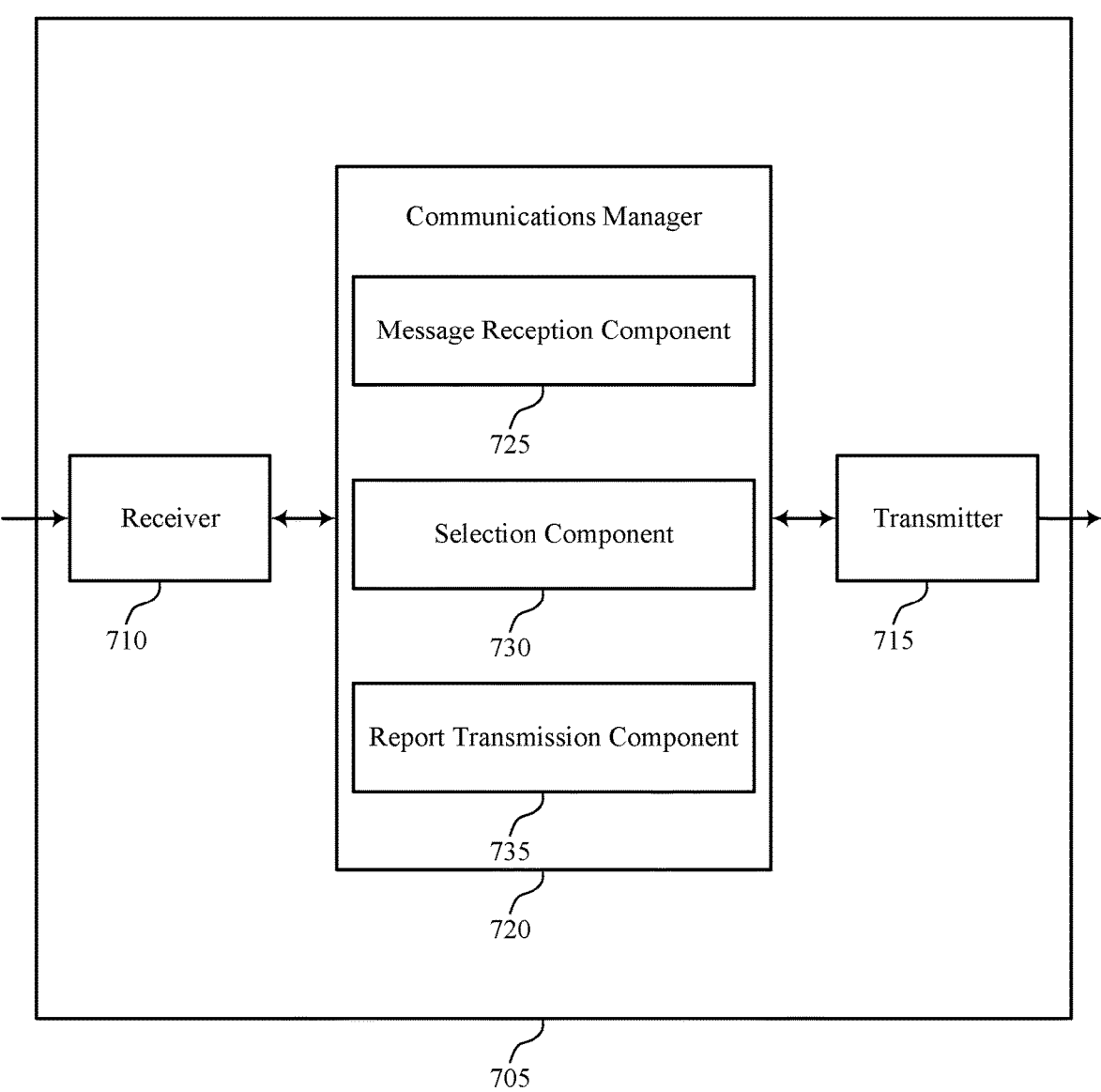

FIG. 7 shows a block diagram 700 of a device 705 that supports conditional AI, machine learning model, and parameter set configurations in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to conditional AI, machine learning model, and parameter set configurations). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to conditional AI, machine learning model, and parameter set configurations). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of conditional AI, machine learning model, and parameter set configurations as described herein. For example, the communications manager 720 may include a message reception component 725, a selection component 730, a report transmission component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The message reception component 725 may be configured as or otherwise support a means for receiving a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The model selection component 730 may be configured as or otherwise support a means for selecting a first machine learning model of the set of multiple machine learning models, a first parameter set of the set of multiple parameter sets, or both for performing the machine learning inference based on a usage condition of the one or more usage conditions being satisfied. The report transmission component 735 may be configured as or otherwise support a means for transmitting a report indicating the machine learning inference that is generated by the first machine learning model or by using the first parameter set.

Figure 8:
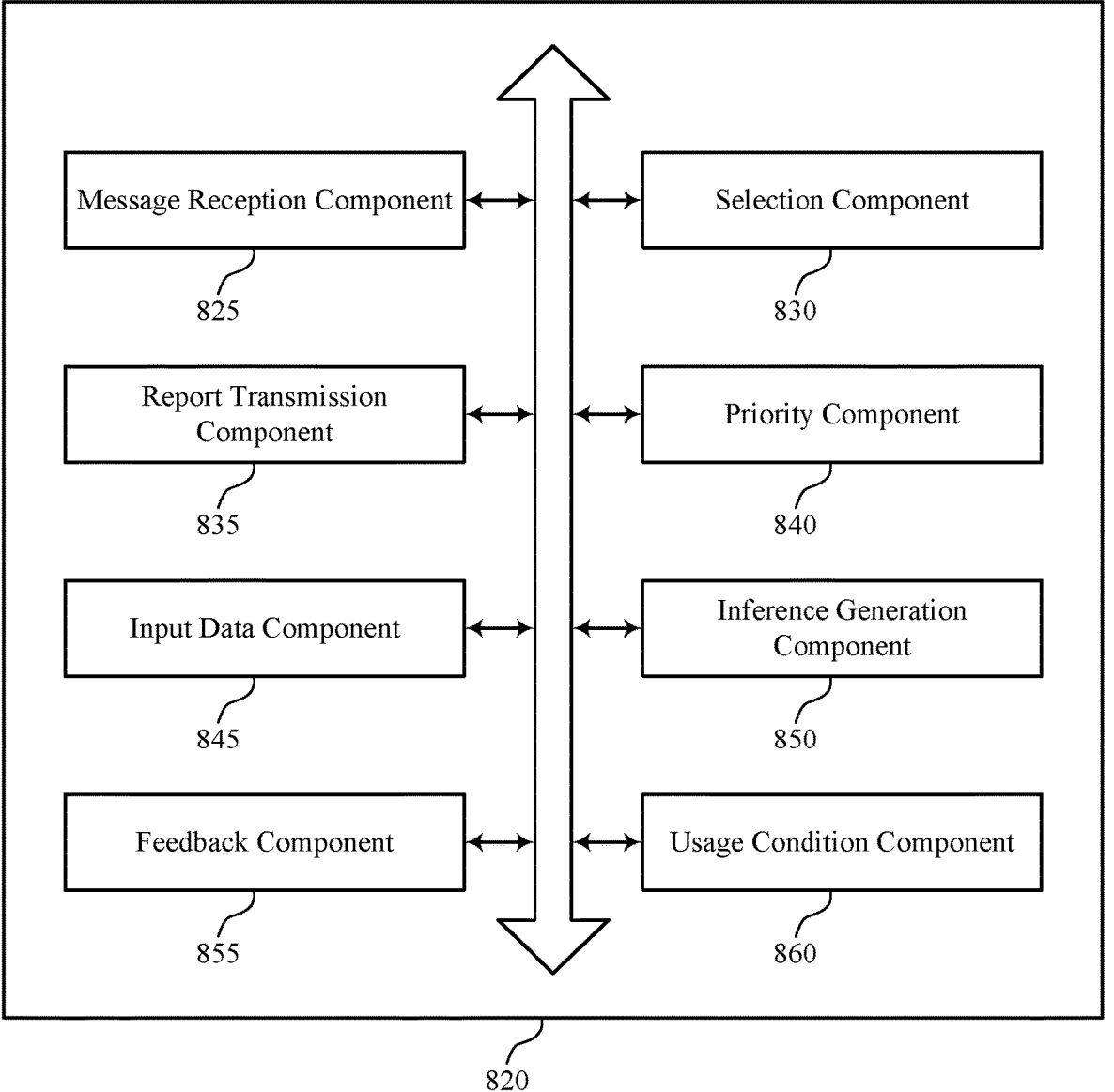
FIG. 8 shows a block diagram of a communications manager that supports conditional AI, machine learning model, and parameter set configurations in accordance with one or more aspects of the present disclosure.

FIG. 8 shows a block diagram 800 of a communications manager 820 that supports conditional AI, machine learning model, and parameter set configurations in accordance with one or more aspects of the present disclosure. The communications manager 820 may be an example of aspects of a communications manager 620, a communications manager 720, or both, as described herein. The communications manager 820, or various components thereof, may be an example of means for performing various aspects of conditional AI, machine learning model, and parameter set configurations as described herein. For example, the communications manager 820 may include a message reception component 825, a selection component 830, a report transmission component 835, a priority component 840, an input data component 845, an inference generation component 850, a feedback component 855, a usage condition component 860, or any combination thereof. Each of these components may communicate, directly or indirectly, with one another (e.g., via one or more buses).

The communications manager 820 may support wireless communication at a UE in accordance with examples as disclosed herein. The message reception component 825 may be configured as or otherwise support a means for receiving a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The model selection component 830 may be configured as or otherwise support a means for selecting a first machine learning model of the set of multiple machine learning models, a first parameter set of the set of multiple parameter sets, or both for performing the machine learning inference based on a usage condition of the one or more usage conditions being satisfied. The report transmission component 835 may be configured as or otherwise support a means for transmitting a report indicating the machine learning inference that is generated by the first machine learning model or by using the first parameter set.

In some examples, the priority component 840 may be configured as or otherwise support a means for receiving the first message indicating a set of multiple priorities corresponding to the set of multiple machine learning models, the set of multiple parameter sets, or both. In some examples, the selection component 830 may be configured as or otherwise support a means for selecting the first machine learning model, the first parameter set, or both for performing the machine learning inference based on the first machine learning model, the first parameter set, or both being associated with a highest priority of the set of multiple priorities.

In some examples, the priority component 840 may be configured as or otherwise support a means for receiving the first message indicating that a network node changed a priority of one or more of the set of multiple machine learning models, one or more of the set of multiple parameter sets, or both based on one or more performance indicators reported by the UE, where the first machine learning model, the first parameter set, or both is selected based on the first message.

In some examples, the input data component 845 may be configured as or otherwise support a means for selecting the first machine learning model, the first parameter set, or both for performing the machine learning inference based on the usage condition indicating to select the first machine learning model, the first parameter set, or both when the UE is able to successfully receive input data from a network node. In some examples, the inference generation component 850 may be configured as or otherwise support a means for generating, by the first machine learning model or by using the first parameter set, the machine learning inference using the input data received from the network node.

In some examples, the input data component 845 may be configured as or otherwise support a means for selecting the first machine learning model, the first parameter set, or both for performing the machine learning inference based on the usage condition indicating to select the first machine learning model, the first parameter set, or both when the UE fails to receive input data from a network node for a second machine learning model of the set of multiple machine learning models, a second parameter set of the set of multiple parameter sets, or both. In some examples, the report transmission component 835 may be configured as or otherwise support a means for transmitting the report indicating the machine learning inference and indicating the first machine learning model, the first parameter set, or both.

In some examples, the inference generation component 850 may be configured as or otherwise support a means for generating, by the first machine learning model or by using the first parameter set, the machine learning inference using input data measured by the UE based on the usage condition indicating to select the first machine learning model, the first parameter set, or both when the UE measures the input data.

In some examples, the feedback component 855 may be configured as or otherwise support a means for transmitting a first feedback message indicating one or more statistics associated with switching between selecting the set of multiple machine learning models, the set of multiple parameter sets, or both.

In some examples, the feedback component 855 may be configured as or otherwise support a means for receiving a second feedback message indicating one or more statistics associated with switching between selecting the set of multiple machine learning models, the set of multiple parameter sets, or both.

In some examples, the usage condition component 860 may be configured as or otherwise support a means for receiving the first message or a second message indicating the one or more usage conditions for selecting one of the set of multiple machine learning models, one of the set of multiple parameter sets, or both, where the one or more usage conditions include at least one of instructions for selecting one of the set of multiple machine learning models, one of the set of multiple parameter sets, or both when input data is missing, or a priority corresponding to each machine learning model of the set of multiple machine learning models, each parameter set of the set of multiple parameter sets, or both for selecting one of the set of multiple machine learning model, one of the set of multiple parameter sets, or both.

In some examples, the instructions for selecting one of the set of multiple machine learning models, one of the set of multiple parameter sets, or both include an availability of input data, a usage scenario, an area scope, a model validity timer, a parameter set validity timer, a configuration of the UE, a configuration of a network node, a performance threshold, or any combination thereof.

In some examples, to support receiving the first message, the message reception component 825 may be configured as or otherwise support a means for receiving the first message or a second message indicating configuration information for the set of multiple machine learning models, a set of multiple parameter sets, or both, where the configuration information indicates a set of alternative machine learning models of the set of multiple machine learning models, a set of alternative parameter sets of the set of multiple parameter sets, the one or more usage conditions, a priority corresponding to each machine learning model, a priority corresponding to each machine learning model, or any combination thereof.

Figure 9:
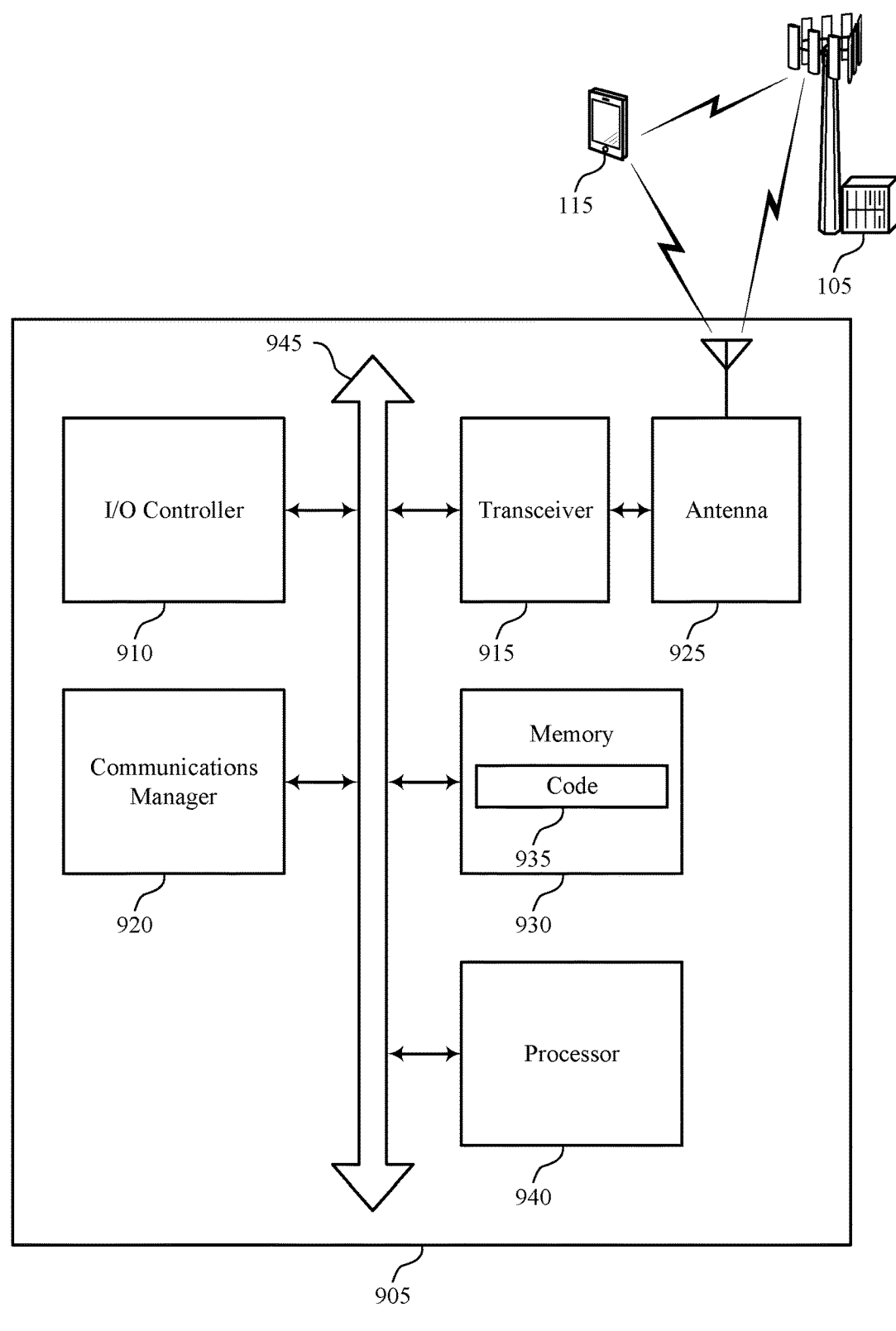
FIG. 9 shows a diagram of a system including a device that supports conditional AI, machine learning model, and parameter set configurations in accordance with one or more aspects of the present disclosure.

FIG. 9 shows a diagram of a system 900 including a device 905 that supports conditional AI, machine learning model, and parameter set configurations in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting conditional AI, machine learning model, and parameter set configurations). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The communications manager 920 may be configured as or otherwise support a means for selecting a first machine learning model of the set of multiple machine learning models, a first parameter set of the set of multiple parameter sets for performing the machine learning inference based on a usage condition of the one or more usage conditions being satisfied. The communications manager 920 may be configured as or otherwise support a means for transmitting a report indicating the machine learning inference that is generated by the first machine learning model or by using the first parameter set.

By including or configuring the communications manager 920 in accordance with examples as described herein, the device 905 may support techniques for selecting machine learning models, parameter sets, or both based on usage conditions, which may reduce errors and false predictions in machine learning model outputs and improve machine learning inference results.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of conditional AI, machine learning model, and parameter set configurations as described herein, or the processor 940 and the memory 930 may be otherwise configured to perform or support such operations.

Figure 10:
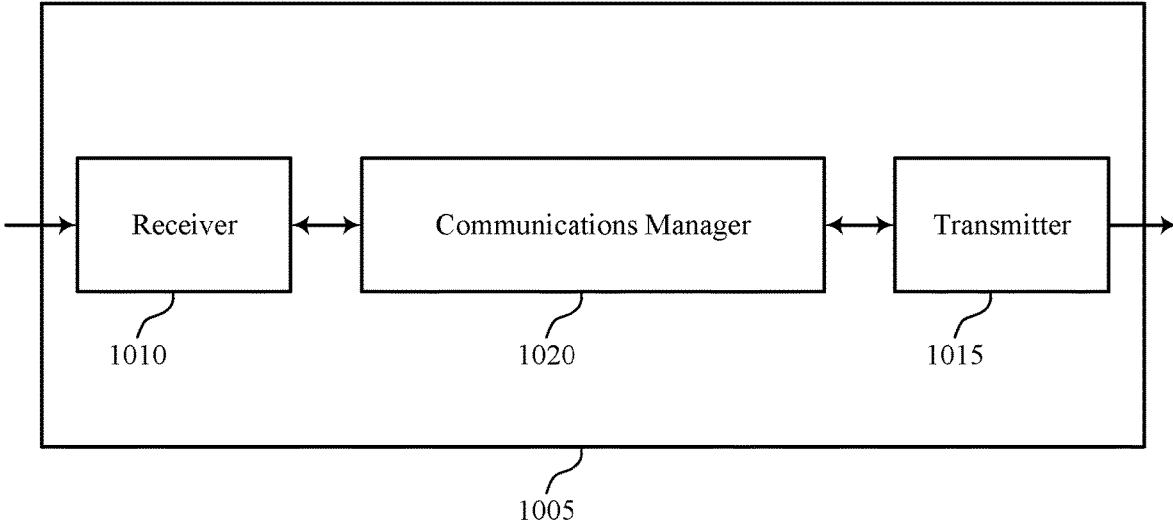
FIGS. 10 and 11 show block diagrams of devices that support conditional AI, machine learning model, and parameter set configurations in accordance with one or more aspects of the present disclosure.

FIG. 10 shows a block diagram 1000 of a device 1005 that supports conditional AI, machine learning model, and parameter set configurations in accordance with one or more aspects of the present disclosure. The device 1005 may be an example of aspects of a network node as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of conditional AI, machine learning model, and parameter set configurations as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network node in accordance with examples as disclosed herein. For example, the communications manager 1020 may be configured as or otherwise support a means for transmitting a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The communications manager 1020 may be configured as or otherwise support a means for receiving a report indicating the machine learning inference that is generated by a first machine learning model or by using a first parameter set selected by a UE based on a usage condition of the one or more usage conditions being satisfied.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for selecting machine learning models, parameter sets, or both based on usage conditions, which may reduce errors and false predictions in machine learning model outputs and improve machine learning inference results.

Figure 11:
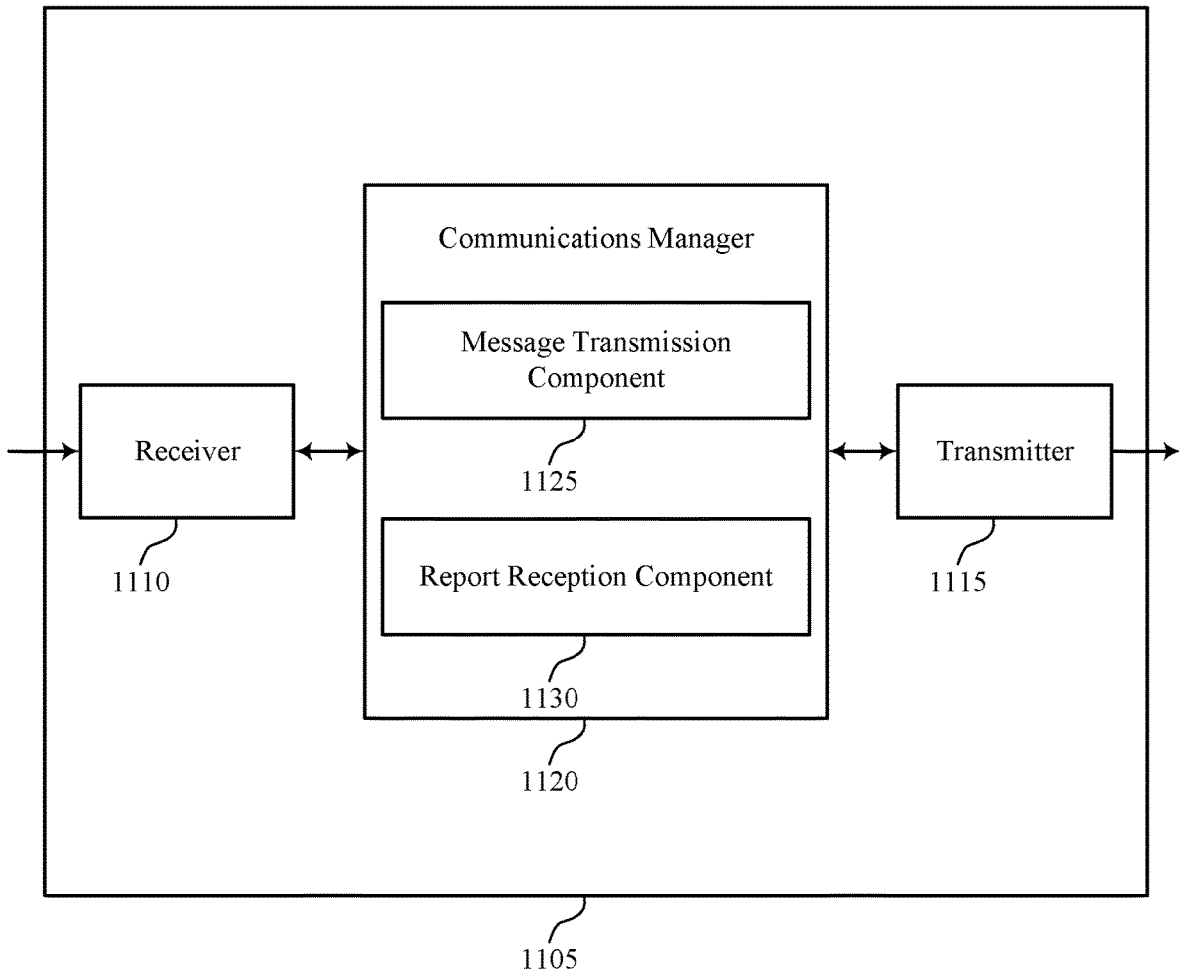

FIG. 11 shows a block diagram 1100 of a device 1105 that supports conditional AI, machine learning model, and parameter set configurations in accordance with one or more aspects of the present disclosure. The device 1105 may be an example of aspects of a device 1005 or a network node 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of conditional AI, machine learning model, and parameter set configurations as described herein. For example, the communications manager 1120 may include a message transmission component 1125 a report reception component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network node in accordance with examples as disclosed herein. The message transmission component 1125 may be configured as or otherwise support a means for transmitting a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The report reception component 1130 may be configured as or otherwise support a means for receiving a report indicating the machine learning inference that is generated by a first machine learning model or by using a first parameter set selected by a UE based on a usage condition of the one or more usage conditions being satisfied.

Figure 12:
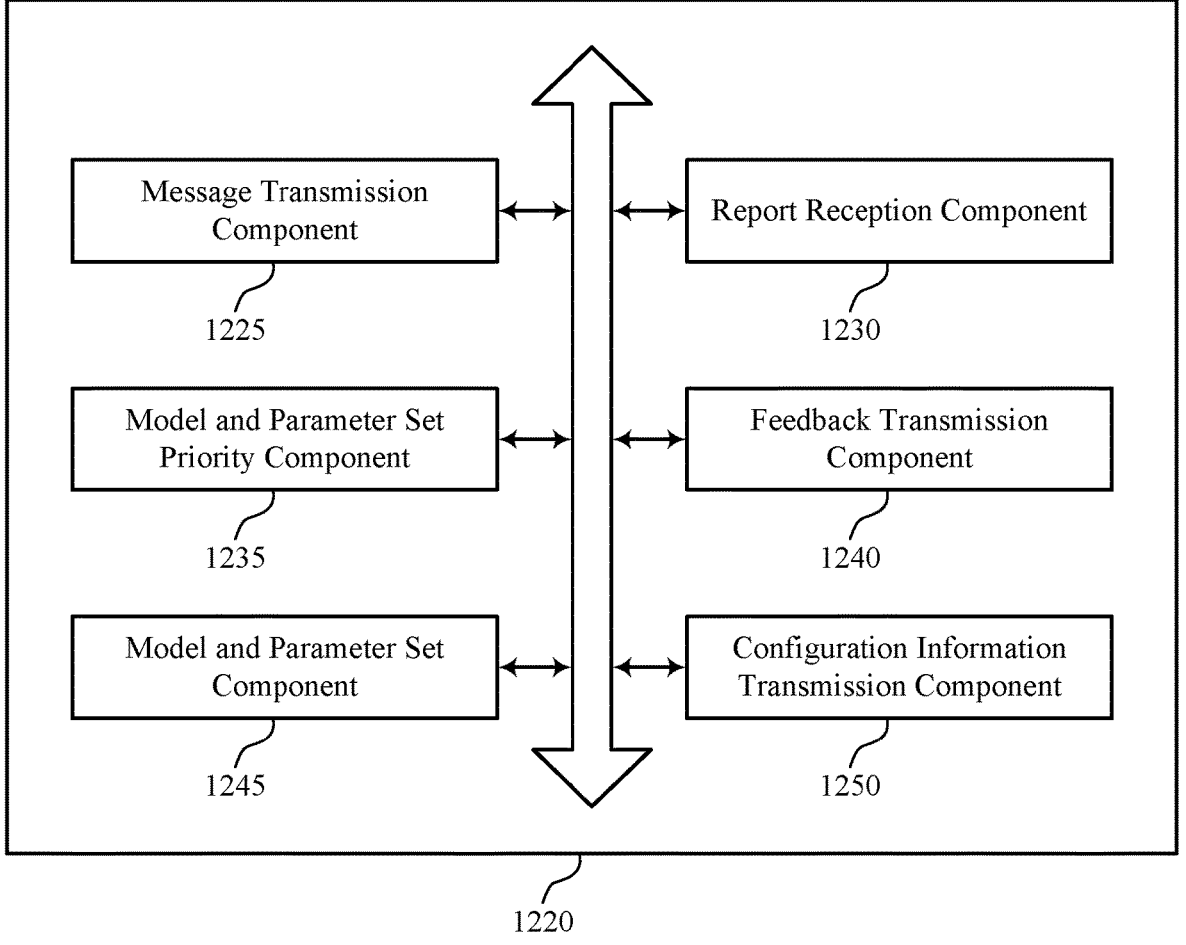
FIG. 12 shows a block diagram of a communications manager that supports conditional AI, machine learning model, and parameter set configurations in accordance with one or more aspects of the present disclosure.

FIG. 12 shows a block diagram 1200 of a communications manager 1220 that supports conditional AI, machine learning model, and parameter set configurations in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of conditional AI, machine learning model, and parameter set configurations as described herein. For example, the communications manager 1220 may include a message transmission component 1225, a report reception component 1230, a model and parameter set priority component 1235, a feedback transmission component 1240, a model and parameter set component 1245, a configuration information transmission component 1250, or any combination thereof. Each of these components may communicate, directly or indirectly, with one another (e.g., via one or more buses).

The communications manager 1220 may support wireless communication at a network node in accordance with examples as disclosed herein. The message transmission component 1225 may be configured as or otherwise support a means for transmitting a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The report reception component 1230 may be configured as or otherwise support a means for receiving a report indicating the machine learning inference that is generated by a first machine learning model or by using a first parameter set selected by a UE based on a usage condition of the one or more usage conditions being satisfied.

In some examples, the model and parameter set priority component 1235 may be configured as or otherwise support a means for transmitting the first message indicating a set of multiple priorities corresponding to the set of multiple machine learning models, the set of multiple parameter sets, or both.

In some examples, the model and parameter set priority component 1235 may be configured as or otherwise support a means for transmitting the first message indicating that the network node changed a priority of one or more of the set of multiple machine learning models, one or more of the set of multiple parameter sets, or both based on one or more performance indicators reported by the UE, where the first machine learning model, the first parameter set, or both is selected based on the first message.

In some examples, the report reception component 1230 may be configured as or otherwise support a means for receiving the report indicating the machine learning inference and indicating that the UE selected the first machine learning model, the first parameter set, or both to generate the machine learning inference.

In some examples, the feedback transmission component 1240 may be configured as or otherwise support a means for transmitting a feedback message indicating one or more statistics associated with switching between the set of multiple machine learning models, the set of multiple parameter sets, or both.

In some examples, the model and parameter set component 1245 may be configured as or otherwise support a means for transmitting the first message or a second message indicating the one or more usage conditions for selecting one of the set of multiple machine learning models, one of the set of multiple parameter sets, or both, where the one or more usage conditions include at least one of instructions for selecting one of the set of multiple machine learning models, one of the set of multiple parameter sets when input data is missing, or a priority corresponding to each machine learning model of the set of multiple machine learning models, each parameter set of the set of multiple parameter sets for selecting one of the set of multiple machine learning models, one of the set of multiple parameter sets, or both.

In some examples, the instructions for selecting one of the set of multiple machine learning models, one of the set of multiple parameter sets, or both include an availability of input data, a usage scenario, an area scope, a model validity timer, a parameter set validity timer, a configuration of the UE, a configuration of a network node, a performance threshold, or any combination thereof.

In some examples, to support transmitting the first message, the configuration information transmission component 1250 may be configured as or otherwise support a means for transmitting the first message or a second message indicating configuration information for the set of multiple machine learning models, the set of multiple parameter sets, or both, where the configuration information indicates a set of alternative machine learning models=of the set of multiple machine learning models, a set of alternative machine learning models of the set of multiple parameter sets, or both, the one or more usage conditions, a priority corresponding to each machine learning model, a priority corresponding to each parameter set, or any combination thereof.

Figure 13:
FIG. 13 shows a diagram of a system including a device that supports conditional AI, machine learning model, and parameter set configurations in accordance with one or more aspects of the present disclosure.

FIG. 13 shows a diagram of a system 1300 including a device 1305 that supports conditional AI, machine learning model, and parameter set configurations in accordance with one or more aspects of the present disclosure. The device 1305 may be an example of or include the components of a device 1005, a device 1105, or a network node as described herein. The device 1305 may include components for bi-directional voice and data communications including components for transmitting and receiving communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting conditional AI, machine learning model, and parameter set configurations).

For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network node in accordance with examples as disclosed herein. For example, the communications manager 1320 may be configured as or otherwise support a means for transmitting a first message indicating a set of multiple machine learning models, a set of multiple parameter sets, or both, and indicating one or more usage conditions for selecting one of the set of multiple machine learning models one of the set of multiple parameter sets, or both for performing a machine learning inference. The communications manager 1320 may be configured as or otherwise support a means for receiving a report indicating the machine learning inference that is generated by a first machine learning model or by using the first parameter set selected by a UE based on a usage condition of the one or more usage conditions being satisfied.

By including or configuring the communications manager 1320 in accordance with examples as described herein, the device 1305 may support techniques for selecting machine learning models, parameter sets, or both based on usage conditions, which may reduce errors and false predictions in machine learning model outputs and improve machine learning inference results.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of conditional AI, machine learning model, and parameter set configurations as described herein, or the processor 1335 and the memory 1325 may be otherwise configured to perform or support such operations.

FIG. 14 shows a flowchart illustrating a method 1400 that supports conditional AI, machine learning model, and parameter set configurations in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a set of multiple machine learning models, a set of multiple parameter sets, or both, and indicating one or more usage conditions for selecting one of the set of multiple machine learning models one of the set of multiple parameter sets, or both for performing a machine learning inference. The operations of 1405 may be performed in accordance with examples as disclosed herein. In some examples, aspects of the operations of 1405 may be performed by a message reception component 825 as described with reference to FIG. 8.

At 1410, the method may include selecting a first machine learning model of the set of multiple machine learning models, a first parameter set of the set of multiple parameter sets, or both for performing the machine learning inference based on a usage condition of the one or more usage conditions being satisfied. The operations of 1410 may be performed in accordance with examples as disclosed herein. In some examples, aspects of the operations of 1410 may be performed by a selection component 830 as described with reference to FIG. 8.

At 1415, the method may include transmitting a report indicating the machine learning inference that is generated by the first machine learning model or by using the first parameter set. The operations of 1415 may be performed in accordance with examples as disclosed herein. In some examples, aspects of the operations of 1415 may be performed by a report transmission component 835 as described with reference to FIG. 8.

FIG. 15 shows a flowchart illustrating a method 1500 that supports conditional AI, machine learning model, and parameter set configurations in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The operations of 1505 may be performed in accordance with examples as disclosed herein. In some examples, aspects of the operations of 1505 may be performed by a message reception component 825 as described with reference to FIG. 8.

At 1510, the method may include selecting a first machine learning model, a first parameter set, or both for performing the machine learning inference based on a usage condition of the one or more usage conditions indicating to select the first machine learning model, the first machine learning model, or both when the UE is able to successfully receive input data from a network node. The operations of 1510 may be performed in accordance with examples as disclosed herein. In some examples, aspects of the operations of 1510 may be performed by a selection component 830 as described with reference to FIG. 8.

At 1515, the method may include generating, by the first machine learning model or by using the first parameter set, the machine learning inference using the input data received from the network node. The operations of 1515 may be performed in accordance with examples as disclosed herein. In some examples, aspects of the operations of 1515 may be performed by an inference generation component 850 as described with reference to FIG. 8.

At 1520, the method may include transmitting a report indicating the machine learning inference that is generated by the first machine learning model or by using the first parameter set. The operations of 1520 may be performed in accordance with examples as disclosed herein. In some examples, aspects of the operations of 1520 may be performed by a report transmission component 835 as described with reference to FIG. 8.

FIG. 16 shows a flowchart illustrating a method 1600 that supports conditional AI, machine learning model, and parameter set configurations in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a first message indicating a set of multiple machine learning models, a set of multiple parameter sets, or both, and indicating one or more usage conditions for selecting one of the set of multiple machine learning models one of the set of multiple parameter sets, or both for performing a machine learning inference. The operations of 1605 may be performed in accordance with examples as disclosed herein. In some examples, aspects of the operations of 1605 may be performed by a message reception component 825 as described with reference to FIG. 8.

At 1610, the method may include selecting a first machine learning model, a first parameter set, or both for performing the machine learning inference based on a usage condition of the one or more usage conditions indicating to select the first machine learning model, the first parameter set, or both when the UE fails to receive input data from a network node for a second machine learning model of the set of multiple machine learning models, a second parameter set of the set of multiple parameter sets, or both. The operations of 1610 may be performed in accordance with examples as disclosed herein. In some examples, aspects of the operations of 1610 may be performed by a selection component 830 as described with reference to FIG. 8.

At 1615, the method may include transmitting a report indicating the machine learning inference that is generated by the first machine learning model or by using the parameter set, and indicating the first machine learning model, the first parameter set, or both. The operations of 1615 may be performed in accordance with examples as disclosed herein. In some examples, aspects of the operations of 1615 may be performed by a report transmission component 835 as described with reference to FIG. 8.

FIG. 17 shows a flowchart illustrating a method 1700 that supports conditional AI, machine learning model, and parameter set configurations in accordance with one or more aspects of the present disclosure. The operations of the method 1700 may be implemented by a network node or its components as described herein. For example, the operations of the method 1700 may be performed by a network node as described with reference to FIGS. 1 through 5 and 10 through 13. In some examples, a network node may execute a set of instructions to control the functional elements of the network node to perform the described functions. Additionally, or alternatively, the network node may perform aspects of the described functions using special-purpose hardware.

At 1705, the method may include transmitting a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The operations of 1705 may be performed in accordance with examples as disclosed herein. In some examples, aspects of the operations of 1705 may be performed by a message transmission component 1225 as described with reference to FIG. 12.

At 1710, the method may include receiving a report indicating the machine learning inference that is generated by a first machine learning model or by using a first parameter set selected by a UE based on a usage condition of the one or more usage conditions being satisfied. The operations of 1710 may be performed in accordance with examples as disclosed herein. In some examples, aspects of the operations of 1710 may be performed by a report reception component 1230 as described with reference to FIG. 12.

FIG. 18 shows a flowchart illustrating a method 1800 that supports conditional AI, machine learning model, and parameter set configurations in accordance with one or more aspects of the present disclosure. The operations of the method 1800 may be implemented by a network node or its components as described herein. For example, the operations of the method 1800 may be performed by a network node as described with reference to FIGS. 1 through 5 and 10 through 13. In some examples, a network node may execute a set of instructions to control the functional elements of the network node to perform the described functions. Additionally, or alternatively, the network node may perform aspects of the described functions using special-purpose hardware.

At 1805, the method may include transmitting a first message indicating a set of multiple machine learning models, a set of multiple parameter sets, or both, indicating one or more usage conditions for selecting one of the set of multiple machine learning models, one of the set of multiple parameter sets, or both, for performing a machine learning inference, and indicating a set of multiple priorities corresponding to the set of multiple machine learning models, the set of multiple parameter sets, or both. The operations of 1805 may be performed in accordance with examples as disclosed herein. In some examples, aspects of the operations of 1805 may be performed by a message transmission component 1225 as described with reference to FIG. 12.

At 1810, the method may include receiving a report indicating the machine learning inference that is generated by a first machine learning model or by using a first parameter set selected by a UE based on a usage condition of the one or more usage conditions being satisfied. The operations of 1810 may be performed in accordance with examples as disclosed herein. In some examples, aspects of the operations of 1810 may be performed by a report reception component 1230 as described with reference to FIG. 12.

FIG. 19 shows a flowchart illustrating a method 1900 that supports conditional AI, machine learning model, and parameter set configurations in accordance with one or more aspects of the present disclosure. The operations of the method 1900 may be implemented by a network node or its components as described herein. For example, the operations of the method 1900 may be performed by a network node as described with reference to FIGS. 1 through 5 and 10 through 13. In some examples, a network node may execute a set of instructions to control the functional elements of the network node to perform the described functions. Additionally, or alternatively, the network node may perform aspects of the described functions using special-purpose hardware.

At 1905, the method may include transmitting a first message indicating a set of multiple machine learning models, a set of multiple parameter sets, or both, and indicating one or more usage conditions for selecting one of the set of multiple machine learning models, one of the set of multiple parameter sets, or both for performing a machine learning inference. The operations of 1905 may be performed in accordance with examples as disclosed herein. In some examples, aspects of the operations of 1905 may be performed by a message transmission component 1225 as described with reference to FIG. 12.

At 1910, the method may include receiving a report indicating the machine learning inference that is generated by a first machine learning model or by using a first parameter set selected by a UE based on a usage condition of the one or more usage conditions being satisfied. The operations of 1910 may be performed in accordance with examples as disclosed herein. In some examples, aspects of the operations of 1910 may be performed by a report reception component 1230 as described with reference to FIG. 12.

At 1915, the method may include transmitting a feedback message indicating one or more statistics associated with switching between the set of multiple machine learning models, the set of multiple parameter sets, or both. The operations of 1915 may be performed in accordance with examples as disclosed herein. In some examples, aspects of the operations of 1915 may be performed by a feedback transmission component 1240 as described with reference to FIG. 12.

The following provides an overview of aspects of the present disclosure:

Aspect 1: A method for wireless communication at a UE, comprising: receiving a first message indicating a plurality of machine learning models, a plurality of parameter sets, or both, and indicating one or more usage conditions for selecting one of the plurality of machine learning models, one of the plurality of parameter sets, or both, for performing a machine learning inference; selecting a first machine learning model of the plurality of machine learning models, a first parameter set of the plurality of parameter sets, or both, for performing the machine learning inference based at least in part on a usage condition of the one or more usage conditions being satisfied; and transmitting a report indicating the machine learning inference that is generated by the first machine learning model or by using the first parameter set.

Aspect 2: The method of aspect 1, further comprising: receiving the first message indicating a plurality of priorities corresponding to the plurality of machine learning models, the plurality of parameter sets, or both; and selecting the first machine learning model, the first parameter set, or both for performing the machine learning inference based at least in part on the first machine learning model, the first parameter set, or both being associated with a highest priority of the plurality of priorities.

Aspect 3: The method of aspect 2, further comprising: receiving the first message indicating that a network node changed a priority of one or more of the plurality of machine learning models, one or more of the plurality of parameter sets, or both based at least in part on one or more performance indicators reported by the UE, wherein the first machine learning model, the first parameter set, or both is selected based at least in part on the first message.

Aspect 4: The method of any of aspects 1 through 3, further comprising: selecting the first machine learning model, the first parameter set, or both for performing the machine learning inference based at least in part on the usage condition indicating to select the first machine learning model, the first parameter set, or both when the UE is able to successfully receive input data from a network node; and generating, by the first machine learning model or by using the first parameter set, the machine learning inference using the input data received from the network node.

Aspect 5: The method of any of aspects 1 through 4, further comprising: selecting the first machine learning model, the first parameter set, or both for performing the machine learning inference based at least in part on the usage condition indicating to select the first machine learning model, the first parameter set, or both when the UE fails to receive input data from a network node for a second machine learning model of the plurality of machine learning models, a second parameter set of the plurality of parameter sets, or both; and transmitting the report indicating the machine learning inference and indicating the first machine learning model, the first parameter set, or both.

Aspect 6: The method of any of aspects 1 through 5, further comprising: generating, by the first machine learning model or by using the first parameter set, the machine learning inference using input data measured by the UE based at least in part on the usage condition indicating to select the first machine learning model, the first parameter set, or both when the UE measures the input data.

Aspect 7: The method of any of aspects 1 through 6, further comprising: transmitting a first feedback message indicating one or more statistics associated with switching between selecting the plurality of machine learning models, the plurality of parameter sets, or both.

Aspect 8: The method of any of aspects 1 through 7, further comprising: receiving a second feedback message indicating one or more statistics associated with switching between selecting the plurality of machine learning models, the plurality of parameter sets, or both.

Aspect 9: The method of any of aspects 1 through 8, further comprising: receiving the first message or a second message indicating the one or more usage conditions for selecting one of the plurality of machine learning models, one of the plurality of parameter sets, or both, wherein the one or more usage conditions comprise at least one of instructions for selecting one of the plurality of machine learning models, one of the plurality of parameter sets, or both when input data is missing, or a priority corresponding to each machine learning model of the plurality of machine learning models, each parameter set of the plurality of parameter sets, or both for selecting one of the plurality of machine learning models, one of the plurality of parameter sets, or both.

Aspect 10: The method of aspect 9, wherein the instructions for selecting one of the plurality of machine learning models, one of the plurality of parameter sets, or both comprise an availability of input data, a usage scenario, an area scope, a model validity timer, a parameter set validity timer, a configuration of the UE, a configuration of a network node, a performance threshold, or any combination thereof.

Aspect 11: The method of any of aspects 1 through 10, wherein receiving the first message comprises: receiving the first message or a second message indicating configuration information for the plurality of machine learning models, the plurality of parameter sets, or both, wherein the configuration information indicates a set of alternative machine learning models of the plurality of machine learning models, a set of alternative parameter sets of the plurality of parameter sets, the one or more usage conditions, a priority corresponding to each machine learning model, a priority corresponding to each parameter set, or any combination thereof.

Aspect 12: A method for wireless communication at a network node, comprising: transmitting a first message indicating a plurality of machine learning models, a plurality of parameter sets, or both, and indicating one or more usage conditions for selecting one of the plurality of machine learning models, one of the plurality of parameter sets, or both, for performing a machine learning inference; and receiving a report indicating the machine learning inference that is generated by a first machine learning model or by using a first parameter set selected by a UE based at least in part on a usage condition of the one or more usage conditions being satisfied.

Aspect 13: The method of aspect 12, further comprising: transmitting the first message indicating a plurality of priorities corresponding to the plurality of machine learning models, the plurality of parameter sets, or both.

Aspect 14: The method of aspect 13, further comprising: transmitting the first message indicating that the network node changed a priority of one or more of the plurality of machine learning models, one or more of the plurality of parameter sets, or both based at least in part on one or more performance indicators reported by the UE, wherein the first machine learning mode, the first parameter set, or both is selected based at least in part on the first message.

Aspect 15: The method of any of aspects 12 through 14, further comprising: receiving the report indicating the machine learning inference and indicating that the UE selected the first machine learning model, the first parameter set, or both to generate the machine learning inference.

Aspect 16: The method of any of aspects 12 through 15, further comprising: transmitting a feedback message indicating one or more statistics associated with switching between the plurality of machine learning models, the plurality of parameter sets, or both.

Aspect 17: The method of any of aspects 12 through 16, further comprising: transmitting the first message or a second message indicating the one or more usage conditions for selecting one of the plurality of machine learning models, one of the plurality of parameter sets, or both, wherein the one or more usage conditions comprise at least one of instructions for selecting one of the plurality of machine learning models, one of the plurality of parameter sets, or both when input data is missing, or a priority corresponding to each machine learning model of the plurality of machine learning models, each parameter set of the plurality of parameter sets for selecting one of the plurality of machine learning models, one of the plurality of parameter sets, or both.

Aspect 18: The method of aspect 17, wherein the instructions for selecting one of the plurality of machine learning models, one of the plurality of parameter sets, or both comprise an availability of input data, a usage scenario, an area scope, a model validity timer, a parameter set validity timer, a configuration of the UE, a configuration of a network node, a performance threshold, or any combination thereof.

Aspect 19: The method of any of aspects 12 through 18, wherein transmitting the first message comprises: transmitting the first message or a second message indicating configuration information for the plurality of machine learning models, the plurality of parameter sets, or both, wherein the configuration information indicates a set of alternative machine learning models of the plurality of machine learning models, a set of alternative parameter sets of the plurality of parameter sets, the one or more usage conditions, a priority corresponding to each machine learning model, a priority corresponding to each parameter set, or any combination thereof.

Aspect 20: An apparatus for wireless communication at a UE, comprising a processor; memory coupled with the processor; and instructions stored in the memory and executable by the processor to cause the apparatus to perform a method of any of aspects 1 through 11.

Aspect 21: An apparatus for wireless communication at a UE, comprising at least one means for performing a method of any of aspects 1 through 11.

Aspect 22: A non-transitory computer-readable medium storing code for wireless communication at a UE, the code comprising instructions executable by a processor to perform a method of any of aspects 1 through 11.

Aspect 23: An apparatus for wireless communication at a network node, comprising a processor; memory coupled with the processor; and instructions stored in the memory and executable by the processor to cause the apparatus to perform a method of any of aspects 12 through 19.

Aspect 24: An apparatus for wireless communication at a network node, comprising at least one means for performing a method of any of aspects 12 through 19.

Aspect 25: A non-transitory computer-readable medium storing code for wireless communication at a network node, the code comprising instructions executable by a processor to perform a method of any of aspects 12 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions. In addition, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:
   one or more processors;
   one or more memories coupled with the one or more processors; and
   instructions stored in the one or more memories and executable by the one or more processors to cause the UE to:
      receive, from a network node, a first message indicating a plurality of machine learning models, a plurality of parameter sets, or both, and indicating one or more usage conditions associated with a machine learning inference, wherein the one or more usage conditions are for selecting, by the UE, one of the plurality of machine learning models, one of the plurality of parameter sets, or both, for generation of the machine learning inference;
      select, by the UE, a first machine learning model of the plurality of machine learning models, a first parameter set of the plurality of parameter sets, or both, for the UE to use to generate the machine learning inference, wherein selection of the first machine learning model, the first parameter set, or both, by the UE is based at least in part on a usage condition of the one or more usage conditions being satisfied; and
      transmit, by the UE, a report indicating the machine learning inference that is generated by the first machine learning model or by using the first parameter set selected by the UE.

2. The UE of claim 1, wherein the instructions are further executable by the one or more processors to cause the UE to:
   receive the first message indicating a plurality of priorities corresponding to the plurality of machine learning models, the plurality of parameter sets, or both; and
   select the first machine learning model, the first parameter set, or both for performing the machine learning inference based at least in part on the first machine learning model, the first parameter set, or both being associated with a highest priority of the plurality of priorities.

3. The UE of claim 2, wherein the instructions are further executable by the one or more processors to cause the UE to:
   receive the first message indicating that a network node changed a priority of one or more of the plurality of machine learning models, one or more of the plurality of parameter sets, or both based at least in part on one or more performance indicators reported by the UE, wherein the first machine learning model, the first parameter set, or both is selected based at least in part on the first message.

4. The UE of claim 1, wherein the instructions are further executable by the one or more processors to cause the UE to:
   select the first machine learning model, the first parameter set, or both for performing the machine learning inference based at least in part on the usage condition indicating to select the first machine learning model, the first parameter set, or both when the UE is able to successfully receive input data from a network node; and
   generate, by the first machine learning model or by using the first parameter set, the machine learning inference using the input data received from the network node.

5. The UE of claim 1, wherein the instructions are further executable by the one or more processors to cause the UE to:

select the first machine learning model, the first parameter set, or both for performing the machine learning inference based at least in part on the usage condition indicating to select the first machine learning model, the first parameter set, or both when the UE fails to receive input data from a network node for a second machine learning model of the plurality of machine learning models, a second parameter set of the plurality of parameter sets, or both; and transmit the report indicating the machine learning inference and indicating the first machine learning model, the first parameter set, or both.

6. The UE of claim 1, wherein the instructions are further executable by the one or more processors to cause the UE to:

generate, by the first machine learning model or by using the first parameter set, the machine learning inference using input data measured by the UE based at least in part on the usage condition indicating to select the first machine learning model, the first parameter set, or both when the UE measures the input data.

7. The UE of claim 1, wherein the instructions are further executable by the one or more processors to cause the UE to:

transmit a first feedback message indicating one or more statistics associated with switching between selecting the plurality of machine learning models, the plurality of parameter sets, or both.

8. The UE of claim 1, wherein the instructions are further executable by the one or more processors to cause the UE to:

receive a second feedback message indicating one or more statistics associated with switching between selecting the plurality of machine learning models, the plurality of parameter sets, or both.

9. The UE of claim 1, wherein the instructions are further executable by the one or more processors to cause the UE to:

receive the first message or a second message indicating the one or more usage conditions for selecting one of the plurality of machine learning models, one of the plurality of parameter sets, or both, wherein the one or more usage conditions comprise at least one of instructions for selecting one of the plurality of machine learning models, one of the plurality of parameter sets, or both when input data is missing, or a priority corresponding to each machine learning model of the plurality of machine learning models, each parameter set of the plurality of parameter sets, or both for selecting one of the plurality of machine learning models, one of the plurality of parameter sets, or both.

10. The UE of claim 9, wherein the instructions for selecting one of the plurality of machine learning models, one of the plurality of parameter sets, or both comprise an availability of input data, a usage scenario, an area scope, a model validity timer, a parameter set validity timer, a configuration of the UE, a configuration of a network node, a performance threshold, or any combination thereof.

11. The UE of claim 1, wherein the instructions to receive the first message are executable by the one or more processors to cause the UE to:

receive the first message or a second message indicating configuration information for the plurality of machine learning models, the plurality of parameter sets, or both, wherein the configuration information indicates a set of alternative machine learning models of the plurality of machine learning models, a set of alternative parameter sets of the plurality of parameter sets, the one or more usage conditions, a priority corresponding to each machine learning model, a priority corresponding to each parameter set, or any combination thereof.

12. A network node for wireless communication, comprising:

one or more processors;

one or more memories coupled with the one or more processors; and instructions stored in the one or more memories and executable by the one or more processors to cause the network node to:

transmit, to a user equipment (UE), a first message indicating a plurality of machine learning models, a plurality of parameter sets, or both, and indicating one or more usage conditions associated with a machine learning inference, wherein the one or more usage conditions are for selecting, by the UE, one of the plurality of machine learning models, one of the plurality of parameter sets, or both, to use to generate for the machine learning inference; and receive, from the UE, a report indicating the machine learning inference that is generated by a first machine learning model or by using a first parameter set selected by the UE based at least in part on a usage condition of the one or more usage conditions being satisfied and indicating that the UE selected the first machine learning model, the first parameter set, or both, to generate the machine learning inference.

13. The network node of claim 12, wherein the instructions are further executable by the one or more processors to cause the network node to:

transmit the first message indicating a plurality of priorities corresponding to the plurality of machine learning models, the plurality of parameter sets, or both.

14. The network node of claim 13, wherein the instructions are further executable by the one or more processors to cause the network node to:

transmit the first message indicating that the network node changed a priority of one or more of the plurality of machine learning models, one or more of the plurality of parameter sets, or both based at least in part on one or more performance indicators reported by the UE, wherein the first machine learning model, the first parameter set, or both is selected based at least in part on the first message.

15. The network node of claim 12, wherein the instructions are further executable by the one or more processors to cause the network node to:

transmit a feedback message indicating one or more statistics associated with switching between the plurality of machine learning models, the plurality of parameter sets, or both.

16. The network node of claim 12, wherein the instructions are further executable by the one or more processors to cause the network node to:

transmit the first message or a second message indicating the one or more usage conditions for selecting one of the plurality of machine learning models, one of the plurality of parameter sets, or both, wherein the one or more usage conditions comprise at least one of instructions for selecting one of the plurality of machine learning models, one of the plurality of parameter sets, or both when input data is missing, or a priority corresponding to each machine learning model of the plurality of machine learning models, each parameter set of the plurality of parameter sets, or both for selecting one of the plurality of machine learning models, one of the plurality of parameter sets, or both.

17. The network node of claim 16, wherein the instructions for selecting one of the plurality of machine learning models, one of the plurality of parameter sets, or both comprise an availability of input data, a usage scenario, an area scope, a model validity timer, a parameter set validity timer, a configuration of the UE, a configuration of a network node, a performance threshold, or any combination thereof.

18. The network node of claim 12, wherein the instructions to transmit the first message are executable by the one or more processors to cause the network node to:

transmit the first message or a second message indicating configuration information for the plurality of machine learning models, the plurality of parameter sets, or both, wherein the configuration information indicates a set of alternative machine learning models of the plurality of machine learning models, a set of alternative parameter sets of the plurality of parameter sets, the one or more usage conditions, a priority corresponding to each machine learning model, a priority corresponding to each parameter set, or any combination thereof.

19. A method for wireless communication at a user equipment (UE), comprising:

receiving, from a network node, a first message indicating a plurality of machine learning models, a plurality of parameter sets, or both, and indicating one or more usage conditions associated with a machine learning inference, wherein the one or more usage conditions are for selecting, by the UE, one of the plurality of machine learning models, one of the plurality of parameter sets, or both for generation of the machine learning inference;

selecting, by the UE, a first machine learning model of the plurality of machine learning models, a first parameter set of the plurality of parameter sets, or both, for the UE to use to generate the machine learning inference, wherein selection of the first machine learning model, the first parameter set, or both, by the UE is based at least in part on a usage condition of the one or more usage conditions being satisfied; and transmitting, by the UE, a report indicating the machine learning inference that is generated by the first machine learning model or by using the first parameter set selected by the UE.

20. The method of claim 19, further comprising:

receiving the first message indicating a plurality of priorities corresponding to the plurality of machine learning models, the plurality of parameter sets, or both; and selecting the first machine learning model, the first parameter set, or both for performing the machine learning inference based at least in part on the first machine learning model, the first parameter set, or both being associated with a highest priority of the plurality of priorities.

21. The method of claim 20, further comprising:

receiving the first message indicating that a network node changed a priority of one or more of the plurality of machine learning models, one or more of the plurality of parameter sets, or both based at least in part on one or more performance indicators reported by the UE, wherein the first machine learning model, the first parameter set, or both is selected based at least in part on the first message.

22. The method of claim 19, further comprising:

selecting the first machine learning model, the first parameter set, or both for performing the machine learning inference based at least in part on the usage condition indicating to select the first machine learning model, the first parameter set, or both when the UE is able to successfully receive input data from a network node; and generating, by the first machine learning model, the first parameter set, or both, the machine learning inference using the input data received from the network node.

23. The method of claim 19, further comprising:

selecting the first machine learning model, the first parameter set, or both for performing the machine learning inference based at least in part on the usage condition indicating to select the first machine learning model, the first parameter set, or both when the UE fails to receive input data from a network node for a second machine learning model of the plurality of machine learning models, a second parameter set of the plurality of parameter sets, or both; and transmitting the report indicating the machine learning inference and indicating the first machine learning model, the first parameter set, or both.

24. The method of claim 19, further comprising:

generating, by the first machine learning model, the first parameter set, or both, the machine learning inference using input data measured by the UE based at least in part on the usage condition indicating to select the first machine learning model, the first parameter set, or both when the UE measures the input data.

25. A method for wireless communication at a network node, comprising:

transmitting, to a user equipment (UE), a first message indicating a plurality of machine learning models, a plurality of parameter sets, or both, and indicating one or more usage conditions associated with a machine learning inference, wherein the one or more usage conditions are for selecting, by the UE, one of the plurality of machine learning models, one of the plurality of parameter sets, or both, to use to generate the machine learning inference; and receiving, from the UE, a report indicating the machine learning inference that is generated by a first machine learning model or by using a first parameter set selected by the UE based at least in part on a usage condition of the one or more usage conditions being satisfied and indicating that the UE selected the first machine learning model, the first parameter set, or both, to generate the machine learning inference.

26. The method of claim 25, further comprising:

transmitting the first message indicating a plurality of priorities corresponding to the plurality of machine learning models, the plurality of parameter sets, or both.

27. The method of claim 26, further comprising:

transmitting the first message indicating that the network node changed a priority of one or more of the plurality of machine learning models, one or more of the plurality of parameter sets, or both based at least in part on one or more performance indicators reported by the UE, wherein the first machine learning model, the first parameter set, or both is selected based at least in part on the first message.

28. The method of claim 25, further comprising:

transmitting a feedback message indicating one or more statistics associated with switching between the plurality of machine learning models, the plurality of parameter sets, or both.

\*　\*　\*　\*　\*